(12) United States Patent
Itoh et al.

(10) Patent No.: US 8,148,937 B2
(45) Date of Patent: Apr. 3, 2012

(54) ALTERNATING-CURRENT MOTOR CONTROL APPARATUS

(75) Inventors: Takeshi Itoh, Nagoya (JP); Keiichi Kawakami, Tsukuba (JP)

(73) Assignees: Toyota Jidosha Kabushiki Kaisha, Toyota-shi (JP); Denso Corporation, Kariya (JP)

( * ) Notice: Subject to any disclaimer, the term of this patent is extended or adjusted under 35 U.S.C. 154(b) by 374 days.

(21) Appl. No.: 12/620,198

(22) Filed: Nov. 17, 2009

(65) Prior Publication Data

US 2010/0123418 A1    May 20, 2010

(30) Foreign Application Priority Data

Nov. 17, 2008    (JP) ................................ 2008-293636

(51) Int. Cl.
*H22P 23/00*    (2006.01)

(52) U.S. Cl. ... 318/809; 318/432; 318/700; 318/400.23; 318/722; 180/402; 180/443; 180/54.1; 701/22; 701/42; 701/31.4; 123/179.5; 123/618; 123/643; 310/156.53; 310/156.56; 310/268

(58) Field of Classification Search ............. 318/400.01, 318/400.23, 400.1–400.07, 722, 701, 268, 318/727, 807, 608, 148, 432, 433, 567, 801, 318/809, 696, 599, 800, 802, 700, 812, 714, 318/400.15, 434; 180/402, 443, 446, 54.1, 180/65.285, 65.235; 310/156.53, 156.56, 310/268; 701/22, 42, 31.4, 150; 123/179.5, 123/406.57, 618, 609, 643
See application file for complete search history.

(56) References Cited

U.S. PATENT DOCUMENTS 6,781,333 B2 *   8/2004   Koide et al. ................... 318/432
7,960,930 B2 *   6/2011   Sato ............................. 318/432

FOREIGN PATENT DOCUMENTS

JP    2007-159368 A    6/2007

* cited by examiner

*Primary Examiner* — Walter Benson
*Assistant Examiner* — Jorge Carrasquillo
(74) *Attorney, Agent, or Firm* — Kenyon & Kenyon LLP

(57) ABSTRACT

When a rectangular wave voltage control mode is selected, a control apparatus estimates the output torque of an alternating-current motor based on the outputs of a current sensor and a rotation angle sensor, and executes torque feedback control by adjusting the phase of rectangular wave voltage based on the difference between the torque estimated value and a torque command value. The control apparatus executes a switching interruption that outputs a control command to a switching element of an inverter every 60 degrees of electrical angle, and executes an angle interruption that samples the phase currents of the alternating-current motor based on the output of the current sensor and converts those phase currents into a d-axis current and a q-axis current every predetermined electrical angle that is set beforehand. The control apparatus for the alternating-current motor then sets the predetermined electrical angle such that the number of angle interruptions between switching interruptions varies according to the rotation speed of the alternating-current motor.

11 Claims, 15 Drawing Sheets

FIG. 2

| CONTROL METHOD | PWM CONTROL MODE | | RECTANGULAR WAVE VOLTAGE CONTROL MODE |
|---|---|---|---|
| | SINE WAVE PWM | OVERMODULATION PWM | RECTANGULAR WAVE (ONE PULSE) |
| INVERTER OUTPUT VOLTAGE WAVEFORM | FUNDAMENTAL WAVE COMPONENT | FUNDAMENTAL WAVE COMPONENT | FUNDAMENTAL WAVE COMPONENT |
| MODUCLATION FACTOR | 0 TO APPROXIMATELY 0.61 | MAXIMUM VALUE WITH SINE WAVE PWM TO 0.78 | 0.78 |
| CHARACTERISTIC | LITTLE TORQUE FLUCTUATION | IMPROVEMENT IN OUTPUT IN MEDIUM SPEED REGION | IMPROVEMENT IN OUTPUT IN HIGH SPEED REGION |

MOTOR CURRENT
(V-PHASE CURRENT AND
W-PHASE CURRENT)

TIME

TORQUE

TIME

ALTERNATING-CURRENT MOTOR CONTROL APPARATUS

INCORPORATION BY REFERENCE

The disclosure of Japanese Patent Application No. 2008-293636 filed on Nov. 17, 2008 including the specification, drawings and abstract is incorporated herein by reference in its entirety.

BACKGROUND OF THE INVENTION

1. Field of the Invention

The invention relates to an alternating-current motor control apparatus, and more particularly, an alternating-current motor control apparatus that has a rectangular wave voltage control mode that drives an alternating-current motor by applying rectangular wave voltage to it.

2. Description of the Related Art

Typically, a structure is used that converts direct-current voltage (DC voltage) using an inverter, and then uses this DC voltage to drive an alternating-current motor (AC motor). With this kind of structure, the motor current is typically controlled according to pulse width modulation (PWM) based on vector control in order to drive the motor efficiently.

Also, a structure is also known that controls an AC motor by switching between rectangular wave voltage control that drives the AC motor by applying rectangular wave voltage to it and PWM control in order to improve motor output. For example, Japanese Patent Application Publication No. 2007-159368 (JP-A-2007-159368) describes AC motor control for preventing a fluctuation in output torque when switching the control method between rectangular wave voltage control and PWM control.

With the motor control method described in JP-A-2007-159368, torque feedback control according to phase control of the rectangular wave voltage pulse based on the difference between the actual torque value and a torque command value is executed when rectangular wave voltage control is selected. In this torque feedback control, an electronic control unit (ECU) that forms a rectangular wave voltage control portion samples the motor current detected by a current sensor at predetermined intervals and estimates the actual torque value using the sampled motor current detected value. That is, in the rectangular wave voltage control, the sampling accuracy of the motor current is directly linked to the estimation accuracy of the actual torque value.

Here, with sine wave PWM control which is used for typical PWM control, the line voltage applied to the AC motor is a sine wave because the amplitude of the sinusoidal voltage command is restricted to equal to or less than the amplitude of the carrier wave (which is representatively a triangular wave). Therefore, the fundamental wave component of the voltage applied to the AC motor is unable to be increased more than approximately 0.61 times the DC link voltage of the inverter.

In contrast, with rectangular wave voltage control, the modulation factor (i.e., the ratio of the fundamental wave component (i.e., the effective value) of the motor applied voltage (i.e., the line voltage) to the DC link voltage of the inverter) can be increased up to 0.78 by applying one rectangular wave pulse, in which the ratio of the high level time to the ON time of the upper arm element of each phase and the ratio of the low level time to the ON time of the lower arm element of each phase is 1:1, to the AC motor. However, the motor applied voltage includes a harmonic component and is therefore distorted instead of a sinusoidal. As a result, the motor current flowing through the AC motor includes a distortion component instead of a sine wave. Therefore, in order to ensure the estimation accuracy of the actual torque value, it is necessary to execute the control together with a filtering process for removing the distortion component from the sampled motor current.

However, incorporating this kind of filtering process into the actual torque value estimating process results in a delay due to the time constant of the filter, so control responsiveness may decrease. In particular, when the rotation speed of the AC motor is low, the control cycle of the torque feedback control increases, and as a result, the delay effect from the filtering process becomes pronounced. On the other hand, when the time constant of the filter is reduced to eliminate the day, the effect from the distortion component in the motor current is unable to be suppressed. As a result, torque fluctuation may occur in the AC motor due to a decrease in the estimation accuracy of the actual torque value.

Incidentally, a control structure in which the motor current is sampled and the filtering process is performed in parallel is effective to avoid this kind of problem. However, this kind of control structure severely increases the load on the ECU, which may lead to an increase in the cost of the apparatus.

SUMMARY OF THE INVENTION

In view of the foregoing problems, the invention provides an alternating-current motor control apparatus that improves control responsiveness and control stability in rectangular wave voltage control with a simple structure.

Therefore, a first aspect of the invention relates to a control apparatus for an alternating-current motor in which applied current is controlled by an inverter. This control apparatus includes a current detector that detects current flowing between the inverter and the alternating-current motor, a position detector that detects a rotational position of the alternating-current motor, and a rectangular wave voltage control portion that generates a control command for the inverter such that rectangular wave voltage that has been phase-controlled to make the alternating-current motor operate according to an operation command is applied to the alternating-current motor. The rectangular wave voltage control portion includes i) a torque estimating portion that estimates the output torque of the alternating-current motor based on the output of the current detector and the output of the position detector, ii) a voltage phase controlling portion that determines the phase of the rectangular wave voltage according to a difference between the torque estimated by the torque estimating portion and a torque command value, and iii) a voltage controlling portion that controls a voltage conversion in the inverter such that rectangular wave voltage according to the phase determined by the voltage phase controlling portion is applied to the alternating-current motor. Every predetermined first electrical angle that is set in advance, the torque estimating portion executes an angle interruption that samples the phase currents of the alternating-current motor based on the output of the current detector and converts the sampled phase currents into a d-axis current and a q-axis current. The predetermined first electrical angle is set such that the number of angle interruptions varies according to the rotation speed of the alternating-current motor.

The predetermined first electrical angle may be set such that the number of angle interruptions increases as the rotation speed of the alternating-current motor decreases.

The torque estimating portion may include an interruption angle setting portion that switches the predetermined first electrical angle between a preset first angle and a preset second angle based on a comparison result between the rotation speed of the alternating-current motor and a predetermined reference rotation speed. Also, the interruption angle setting portion may switch between first angle and the second angle with hysteresis.

The inverter may include a power semiconductor switching element that is selectively turned on and off according to the control command from the rectangular wave voltage control portion. The voltage controlling portion may execute a switching interruption that outputs the control command to the power semiconductor switching element every predetermined second electrical angle that is set in advance. The torque estimating portion may inactivate the angle interruption according to the rotation speed of the alternating-current motor when the timing at which the angle interruption is executed matches the timing at which the switching interruption is executed.

The torque estimating portion may inactivate the angle interruption when the rotation speed of the alternating-current motor falls below a predetermined reference rotation speed.

The inverter may include a power semiconductor switching element that is selectively turned on and off according to the control command from the rectangular wave voltage control portion. The voltage controlling portion may execute a switching interruption that outputs the control command to the power semiconductor switching element every predetermined second electrical angle that is set in advance. The predetermined first electrical angle may be set such that the angle interruption is executed a plurality of times between the last execution of the switching interruption and the current execution of the switching interruption. The torque estimating portion may include a filtering portion that smoothes a change, in the direction of the temporal axis, in the d-axis current and the q-axis current each calculated during the plurality of executions of the angle interruption, and an estimated torque calculating portion that calculates the estimated torque based on the d-axis current and the q-axis current that have been smoothed by the filtering portion.

The voltage phase controlling portion may perform a feedback control calculation that adjusts the phase of the rectangular wave voltage according to a difference between the estimated torque calculated by the estimated torque calculating portion and the torque command value, during the final time that the angle interruption is executed, from among the plurality of times that the angle interruption is executed.

The torque estimating portion may further include a signal converting portion that converts the output of the current detector and the output of the position detector into a digital signal, respectively, in a predetermined conversion cycle. Also, the predetermined first electrical angle may be set such that the execution cycle of the angle interruption becomes longer than the predetermined conversion cycle.

Accordingly, the invention is able to improve control responsiveness and control stability in rectangular wave voltage control with a simple structure.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein:

FIG. 2 is a view schematically showing a control mode of the alternating-current motor in the motor drive system according to this example embodiment;

DETAILED DESCRIPTION OF EMBODIMENTS

Figure 1:
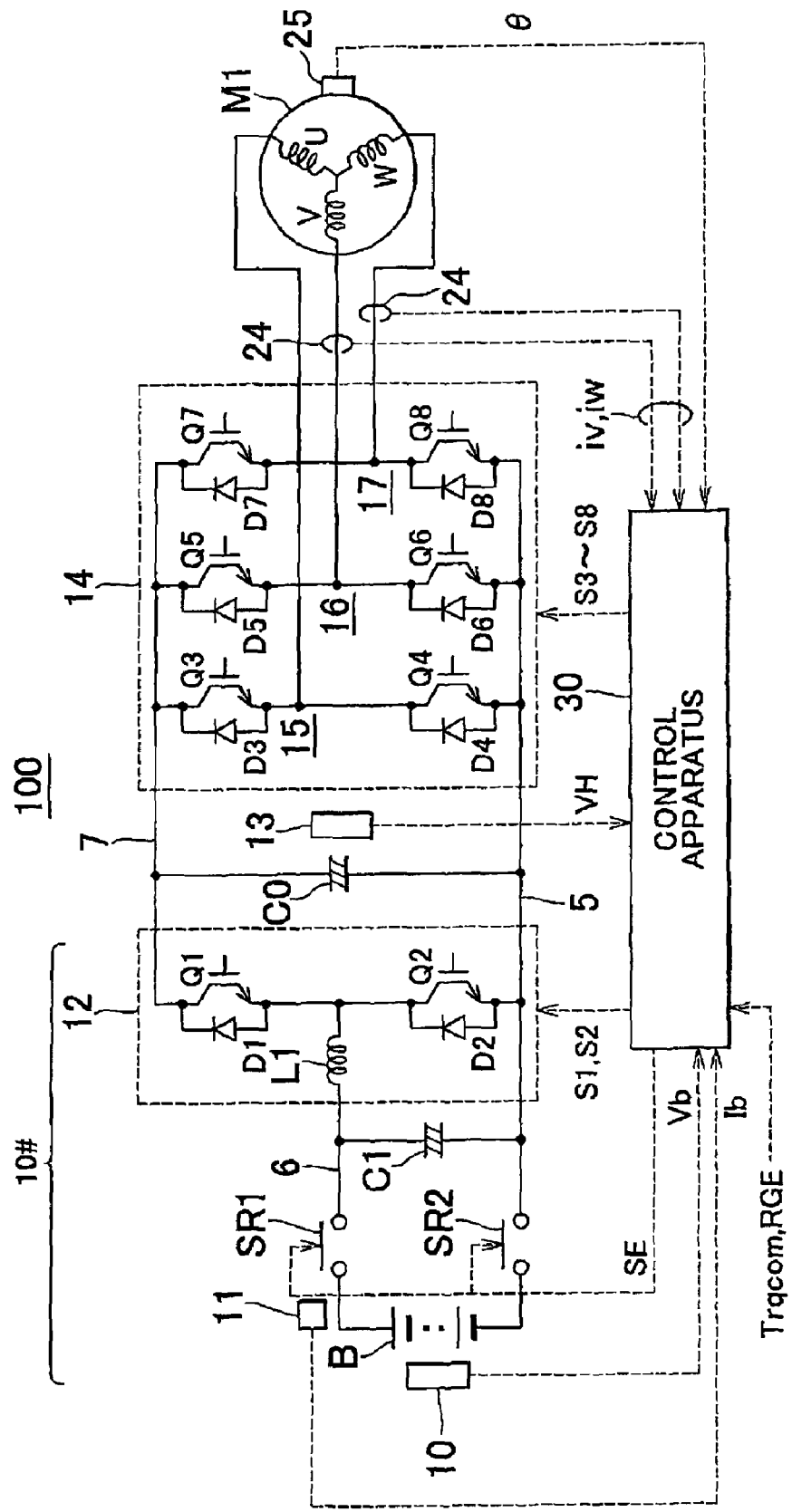
FIG. 1 is an overall block diagram of a motor drive system to which an alternating-current motor control apparatus according to an example embodiment of the invention can be applied.

Example embodiments of the present invention will be described in greater detail below with reference to the accompanying drawings. Incidentally, in the drawings, like reference characters represent like or corresponding parts.

FIG. 1 is an overall block diagram of a motor drive system to which an alternating-current motor control apparatus according to an example embodiment of the invention can be applied. Referring to FIG. 1, a motor drive system 100 includes a direct current voltage generating portion (hereinafter simply referred to as "DC voltage generating portion") 10#, a smoothing condenser C0, an inverter 14, an alternating-current motor (hereinafter simply referred to as "AC motor") M1, and a control apparatus 30.

The AC motor M1 is a driving motor for generating torque used to drive driving wheels of a vehicle powered partly or entirely by electricity (i.e., a vehicle that generates vehicle driving force using electric energy, such as a hybrid vehicle, an electric vehicle, or a fuel cell vehicle, and hereinafter simply referred to as "electric vehicle"). Alternatively, the AC motor M1 may be configured to function as a generator that is driven by an engine, or as both an electric motor and a generator. Moreover, the AC motor M1 may operate as a motor for the engine. For example, the AC motor M1 may be incorporated in a hybrid vehicle as a motor capable of starting the engine. That is, in this example embodiment, the term "AC motor" includes an AC-driven motor, a generator, and a motor/generator.

The DC voltage generating portion 10# includes a DC power supply B, system relays SR1 and SR2, a smoothing condenser C1, and a step-up/down converter 12.

The DC power supply B is representatively formed by a power storage device such as an electric double layer capacitor or a secondary battery such as a nickel-metal-hydride battery or a lithium-ion battery. The DC voltage Vb output by the DC power supply B is detected by a voltage sensor 10, and the DC current Ib input to and output from the DC power supply B is detected by a current sensor 11.

The system relay SR1 is connected between the positive terminal of the DC power supply B and a power line 6. The system relay SR2 is connected between the negative terminal of the DC power supply B and a ground wire 5. These system relays SR1 and SR2 are turned on and off by a signal SE from the control apparatus 30.

The step-up/down converter 12 includes a reactor L1, power semiconductor switching elements Q1 and Q2, and diodes D1 and D2. The power semiconductor switching elements Q1 and Q2 are connected in series between a power line 7 and the ground wire 5. The power semiconductor switching elements Q1 and Q2 are controlled on and off by switching control signals S1 and S2 from the control apparatus 30.

In this example embodiment of the invention, an IGBT (Insulated Gate Bipolar Transistor), a power MOS (Metal Oxide Semiconductor) transistor, or a power bipolar transistor or the like may be used for each of the power semiconductor switching element (hereinafter simply referred to as a "switching element"). The switching element Q1 is provided with an antiparallel diode D1, and the switching element Q2 is provided with an antiparallel diode D2. The reactor L1 is connected between the power line 6 and the connecting nodes of the switching elements Q1 and Q2. Also, the smoothing condenser C0 is connected between the power line 7 and the ground wire 5.

The inverter 14 is formed of a U-phase upper/lower arm 15, a V-phase upper/lower arm 16, and a W-phase upper/lower arm 17, which are parallel to each other between the power line 7 and the ground wire 5. Each phase upper/lower arm is formed of switching elements that are connected in series between the power line 7 and the ground wire 5. For example, the U-phase upper/lower arm 15 is formed of switching elements Q3 and Q4, the V—phase upper/lower arm 16 is formed of switching elements Q5 and Q6, and the W-phase upper/lower arm 17 is formed of switching elements Q7 and Q8. Also, these switching elements Q3 to Q8 are connected to antiparallel diodes D3 to D8, respectively. The switching elements Q3 to Q8 are controlled on and off by switching control signals S3 to S8 from the control apparatus 30.

Representatively, the AC motor M1 is a three-phase permanent magnet type synchronous motor in which one end of a U-phase coil, a V-phase coil, and a W-phase coil are commonly connected to a neutral point. Furthermore, the other end of each of coil is connected to a point midway between the switching elements of the corresponding phase upper/lower arm 15 to 17.

During a step-up operation, the step-up/down converter 12 supplies DC voltage VH in which the DC voltage Vb supplied from the DC power supply B has been stepped up (this DC voltage that corresponds to the voltage input to the inverter 14 may also hereinafter be referred to as the "system voltage") to the inverter 14. More specifically, the period during which the switching element Q1 is on and the period of time during which the switching element Q2 is on (hereinafter simply referred to as the "ON time") (or the periods of time during which both of the switching elements Q1 and Q2 are off) are alternated in response to the switching control signals S1 and S2 from the control apparatus 30, and the step-up ratio corresponds to the ratio of these ON times. Alternatively, VH may also be set equal to Vb (in which case the step-up voltage=1.0) if the switching element Q1 is fixed ON and the switching element Q2 is fixed OFF.

Also, during a step-down operation, the step-up/down converter 12 steps down the DC voltage VH supplied from the inverter 14 via the smoothing condenser C0 (i.e., the system voltage) and recharges the DC power supply B. More specifically, the ON time of the only the switching element Q1 and the OFF time of both of the switching elements Q1 and Q2 (or the ON time of the switching element Q2) are alternated in response to the switching control signals S1 and S2 from the control apparatus 30, and the step-down ratio corresponds to the duty ratio of the ON time.

The smoothing condenser C0 smoothes the DC voltage from the step-up/down condenser 12 and supplies this smoothed DC voltage to the inverter 14. A voltage sensor 13 detects the voltage at both terminals of the smoothing condenser C0, i.e., the system voltage VH, and outputs the detected value to the control apparatus 30.

When the torque command value of the AC motor M1 is positive (i.e., Trqcom>0) and DC current is supplied from the smoothing condenser C0, the inverter 14 converts the DC voltage into AC voltage by a switching operation of the switching elements Q3 to Q8 in response to the switching control signals S3 to S8 from the control apparatus 30 and drives the AC motor M1 to output positive torque. Also, when the torque command value of the AC motor M1 is zero (i.e., Trqcom=0), the inverter 14 converts the DC voltage into AC voltage by the switching operation of the switching elements Q3 to Q8 in response to the switching control signals S3 to S8 and drives the AC motor M1 so that no torque is generated. Accordingly, the AC motor M1 is driven to generate either no torque or positive torque as specified by the torque command value Trqcom.

Moreover, during regenerative braking of the electric vehicle provided with the motor drive system 100, the torque command value Trqcom of the AC motor M1 is set to a negative value (i.e., Trqcom<0). In this case, the inverter 14 converts the AC voltage generated by the AC motor M1 into DC voltage by a switching operation in response to the switching control signals S3 to S8, and supplies that converted DC voltage (i.e., the system voltage) to the step-up/down converter 12 via the smoothing condenser C0. Incidentally, regenerative braking in this case includes both braking that accompanies regenerative power generation when there is a foot brake operation by a driver driving the electric vehicle, and deceleration of the vehicle (or stopping accelerating) while regenerating power by releasing the accelerator pedal while traveling even though the foot brake is not being depressed.

A current sensor 24 detects the motor current running through the AC motor M1 and outputs this detected motor current to the control apparatus 30. Incidentally, the sum of the instantaneous values of the three phase currents iu, iv, and iw is zero, so the current sensor 24 need only be arranged to detect the motor current of two phases (such as the V-phase current iv and the W-phase current iw).

A rotation angle sensor (i.e., a resolver) 25 detects the rotor rotation angle θ of the AC motor M1 and outputs that detected rotation angle θ to the control apparatus 30. The control apparatus 30 is able to calculate the rotation speed (rpm) and the angular velocity ω (rad/s) of the AC motor M1 based on the rotation angle θ. Incidentally, the rotation angle sensor 25 may also be omitted by having the control apparatus 30 calculate the rotation angle θ directly from the motor voltage or current.

The control apparatus 30 is formed of an electronic control unit (ECU) and controls the operation of the motor drive system 100 by software by executing a pre-stored program by a CPU, not shown, and/or by hardware according to a special electronic circuit.

As a representative function, the control apparatus 30 controls the operation of the step-up/down converter 12 and the inverter 14 so that the AC motor M1 outputs torque according to the torque command value Trqcom by a control method described later, based on the input torque command value Trqcom, the DC voltage Vb detected by the voltage sensor 10, the DC current Ib detected by the current sensor 11, the system voltage VH detected by the voltage sensor 13 and the motor currents iv and iw from the current sensor 24, and the rotation angle θ from the rotation angle sensor 25, and the like. That is, switching control signals S1 to S8 are generated to control the step-up/down converter 12 and the inverter 14 in the manner described above, and these switching control signals S1 to S8 are then output to the step-up/down converter 12 and the inverter 14.

During a step-up operation of the step-up/down converter 12, the control apparatus 30 feedback-controls the system voltage VH and generates switching control signals S1 and S2 so that the system voltage VH matches the voltage command value.

Also, when the control apparatus 30 receives a signal RGE indicating that the electric vehicle has switched to the regenerative braking mode from an external ECU, the control apparatus 30 generates the switching control signals S3 to S8 to convert the AC voltage generated by the AC motor M1 into DC voltage, and Outputs these switching control signals S3 to S8 to the inverter 14. As a result, the inverter 14 converts the AC voltage generated by the AC motor M1 into DC voltage, which it then supplies to the step-up/down converter 12.

Furthermore, when the control apparatus 30 receives a signal RGE indicating that the electric vehicle has switched to the regenerative braking mode from an external ECU, the control apparatus 30 generates the switching control signals S1 and S2 to step down the DC voltage supplied by the inverter 14, and outputs these switching control signals S1 and S2 to the step-up/down converter 12. As a result, the AC voltage generated by the AC motor M1 is converted into DC voltage, stepped down, and then supplied to the DC power supply B.

Now the control of the AC motor M1 by the control apparatus 30 will be described in greater detail. FIG. 2 is a view schematically showing a control mode of the AC motor M1 in the motor drive system according to this example embodiment of the invention.

As shown in FIG. 2, in the motor drive system 100 according to the example embodiment of the invention, control of the AC motor M1, i.e., power conversion in the inverter 14, is switched among three different control modes.

Sine wave PWM control is used as typical PWM control and controls the phase upper/lower arms elements on and off according to a voltage comparison of a sinusoidal voltage command and a carrier wave (which is representatively a triangular wave). As a result, the duty of the set of the high level time corresponding to the ON time of the upper arm element and the low level time corresponding to the ON time of the lower arm element is controlled such that the fundamental wave component within a fixed period of time is sinusoidal. As is well known, with sine wave PWM control in which the amplitude of a sinusoidal voltage command is restricted to equal to or less than a carrier wave amplitude, the fundamental wave component of the voltage applied to the AC motor M1 (hereinafter also referred to simply as the "motor applied voltage") can only be increased up to approximately 0.61 times the DC link voltage of the inverter. Hereinafter in this specification, the ratio of the fundamental wave component (i.e., the effective value) of the motor applied voltage (i.e., the line voltage) to the DC link voltage of the inverter 14 (i.e., the system voltage VH) will be referred to as the "modulation factor".

In sine wave PWM control, the amplitude of the sine wave voltage command is equal to or less than the carrier wave amplitude, so the line voltage applied to the AC motor M1 is sinusoidal. Also, a control method of generating a voltage command by superimposing a 3n-order harmonic wave component on a sine wave component of equal to or less than the carrier wave amplitude has also been proposed. In this control method, there is a period during which the voltage command becomes higher than the carrier wave amplitude due to the harmonics, but the 3n-order harmonic wave component superimposed on each phase is negated in the line so the line voltage retains the sine wave. In this example embodiment, this control method is also included in sine wave PWM control.

On the other hand, in rectangular wave voltage control, a single rectangular wave pulse in which the ratio of the high level time to the low level time is 1:1 is applied to the AC motor M1. As a result, the modulation factor can be increased to 0.78.

Overmodulation PWM control performs PWM control just like sine wave PWM control in the range where the amplitude of the voltage command (i.e., the sine wave component) is greater than the carrier wave amplitude). More specifically, the fundamental wave component can be increased by distorting the voltage command from its original sine wave shape (i.e., by amplitude correction), which enables the modulation factor to be increased to 0.78 from the highest modulation factor in the sine wave PWM control mode. In this overmodulation PWM control, the amplitude of the voltage command (i.e., the sine wave component) is greater than the carrier wave amplitude, so the line voltage applied to the AC motor M1 is a distorted, not sinusoidal.

In the AC motor M1, the induced voltage increases as the rotation speed and the output torque increase, so the required driving voltage (i.e., the required motor voltage) increases. The step-up voltage from the step-up/down converter 12, i.e., the system voltage VH, must be set higher than this required motor voltage. On the other hand, the step-up voltage from the step-up/down converter 12, i.e., the system voltage VH, has a limit value (i.e., a maximum VH voltage).

Therefore, either the rectangular wave voltage control mode or the PWM control mode according to sine wave PWM control or overmodulation PWM control, both of which control the amplitude and phase of the motor applied voltage (AC) by feedback of the motor current, is selectively applied according to the operating state of the AC motor M1. Incidentally, in rectangular wave voltage control, the amplitude of the motor applied voltage is fixed, so torque control is executed by phase control of the rectangular wave voltage pulse based on the difference between the actual torque value and the torque command value.

Figure 3:
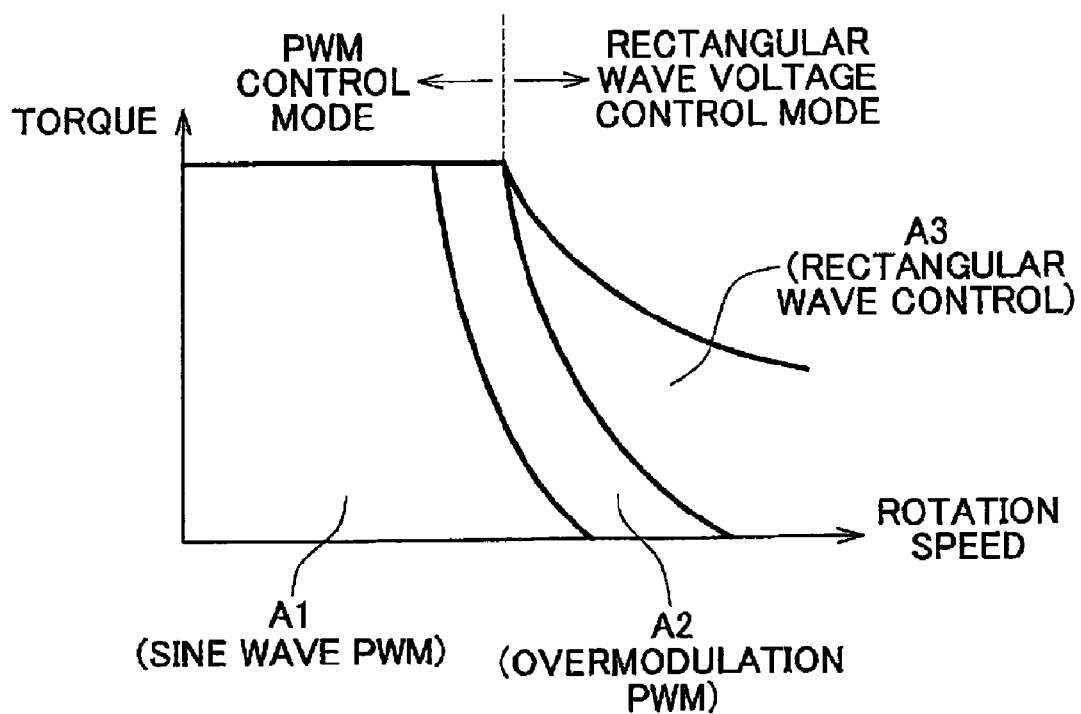
FIG. 3 is a graph showing the corresponding relationship between the operating state of the alternating-current motor of this example embodiment and the control modes shown in FIG. 2.

FIG. 3 is a graph showing the corresponding relationship between the operating state of the AC motor M1 and the control modes described above. Referring to FIG. 3, generally, sine wave PWM control is used in the low speed region A1 to reduce torque fluctuation, while overmodulation PWM control is used in the medium speed region A2, and rectangular wave voltage control is applied in the high speed region A3. In particular, output of the AC motor M1 can be improved by applying overmodulation PWM control and rectangular wave voltage control. In this way, the determination as to which of the control modes shown in FIG. 2 is to be used is basically made based on the modulation factor that is able to be realized.

Hereinafter, the motor control structure when the rectangular wave voltage control, from among the three control modes shown in FIG. 2, is applied, as well as the problems with that control structure will be described.

Figure 4:
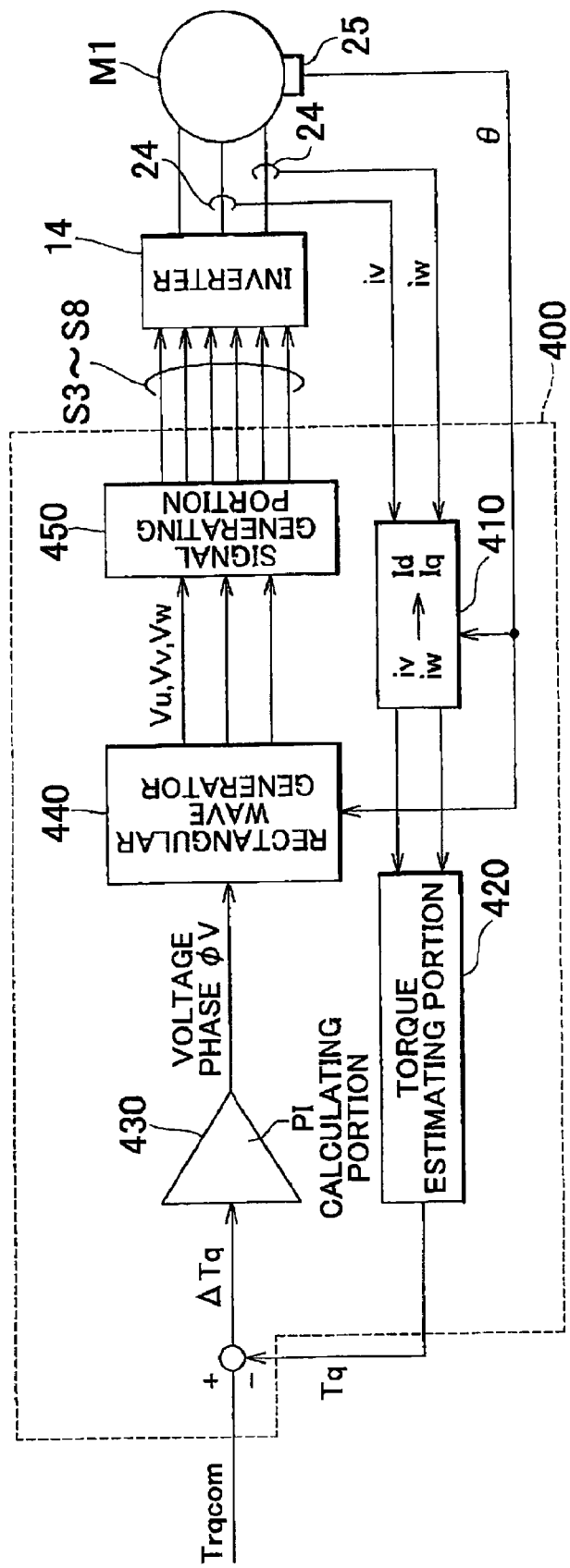
FIG. 4 is a block diagram of a motor control structure according to rectangular wave voltage control, by the alternating-current motor control apparatus of this example embodiment.

FIG. 4 is a block diagram of a motor control structure according to rectangular wave voltage control, by the AC motor control apparatus of this example embodiment of the invention. Each functional block for motor control shown in the block diagram in FIG. 4 is realized by hardware or software by the control apparatus 30.

Referring to FIG. 4, when the rectangular wave voltage control mode is selected, a rectangular wave voltage control portion 400 generates switching control signals S3 to S8 for the inverter 14 so that the AC motor M1 will output torque according to the torque command value Trqcom.

The rectangular wave voltage control portion 400 includes a coordinate converting portion 410, a torque estimating portion 420, a PI calculating portion 430, a rectangular wave generator 440, and a signal generating portion 450.

The coordinate converting portion 410 calculates a d-axis current Id and a q-axis current Iq based on the V-phase current iv and the W-phase current iw detected by the current sensor 24, by a coordinate transformation (three-phase→two-phase) using the rotation angle θ of the AC motor M1 detected by the rotation angle sensor 25.

The torque estimating portion 420 estimates the output torque of the AC motor M1 using the d-axis current Id and the q-axis current Iq obtained by the coordinate calculating portion 410.

More specifically, the torque estimating portion 420 calculates the power to be supplied to the motor (i.e., the motor power) according to Expression (1) below according to the d-axis current Id, the q-axis current Iq, the d-axis voltage Vd, and the q-axis voltage Vq.

$$Pmt = Id \times Vd + Iq \times Vq \quad (1)$$

Incidentally, the d-axis voltage Vd and the q-axis voltage Vq in Expression (1) above are calculated by a coordinate transformation using the rotation angle θ of the AC motor M1 of each phase (i.e., the U-phase, the V-phase, and the W-phase) voltage Vu, Vv, and Vw generated by the rectangular wave generator 440.

Then the torque estimating portion 420 calculates an estimated value Tq according to Expression (2) below using the obtained motor power Pmt and the rotation speed Nm calculated from the rotation angle θ of the AC motor M1 detected by the rotation angle sensor 25.

$$Tq = Pmt/Nm \quad (2)$$

Alternatively, although not shown, the torque estimating portion 420 may also be formed by a torque calculating map that calculates the torque estimated value Tq with the d-axis current Id and the q-axis current Iq as parameters.

Furthermore, instead of these structures, the torque estimating portion 420 may be structured to calculate the torque estimated value Tq according to Expression (3) below, which is a characteristic formula of the AC motor M1.

$$Tq = Kt \times Iq + p \times (Ld - Lq) \times Id \times Iq \quad (3)$$

In Expression (3) above, Kt is a torque constant [N·m/A], p is the pairs of poles, Ld is a d-axis inductance [H], and Lq is a q-axis inductance [H]. Kt, Ld, and Lq are uniquely determined according to the configuration of the AC motor M1 as circuit constants of the motor (i.e., motor constants).

A torque difference ΔTq(ΔTq=Trqcom−Tq) from the torque command value Trqcom is input to the PI calculating portion 430. The PI calculating portion 430 then obtains a control difference by performing a PI calculation according to a predetermined gain for the torque difference ΔTq, and then sets a phase Φv of the rectangular wave voltage according to the obtained control difference. More specifically, when there is positive torque (i.e., Trqcom>0), the voltage phase is advanced when the torque is insufficient and retarded when the torque is excessive. Moreover, when there is negative torque (i.e., Trqcom<0), the voltage phase is retarded when the torque is insufficient and advanced when the torque is excessive.

The rectangular wave generator 440 generates a phase voltage command value (i.e., rectangular wave pulse) Vu, Vv, or Vw according to the voltage phase φv set by the PI calculating portion 430. The signal generating portion 450 generates a switching control signal S3 to S8 according to the phase voltage command value Vu, Vv, and Vw. A rectangular wave pulse according to the voltage phase φv is then applied as the phase voltage of the motor by the inverter 14 performing a switching operation according to the switching control signal S3 to S8.

In this way, when the rectangular wave voltage control mode is applied, motor torque control is performed according to feedback control of the torque (power).

However, in the rectangular wave voltage control mode, only the phase is used as the operating amount of the motor applied voltage, so the control responsiveness is not as good as it is with PWM control that is able to use both the amplitude and the phase of the motor applied voltage as the operating amount. Also, during the coordinate transformation in the coordinate converting portion 410, a filtering process for removing the distortion component from the detected motor currents iv and iw is performed in parallel.

Next, problems with the motor control structure according to typical rectangular wave voltage control shown in FIG. 4 will be described with reference to FIGS. 5 and 6. In particular, adverse effects on the estimation accuracy of the output torque of the AC motor M1 that are caused by the sampling timing of the motor currents iv and iw in the coordinate converting portion 410 will be described.

Figure 5:
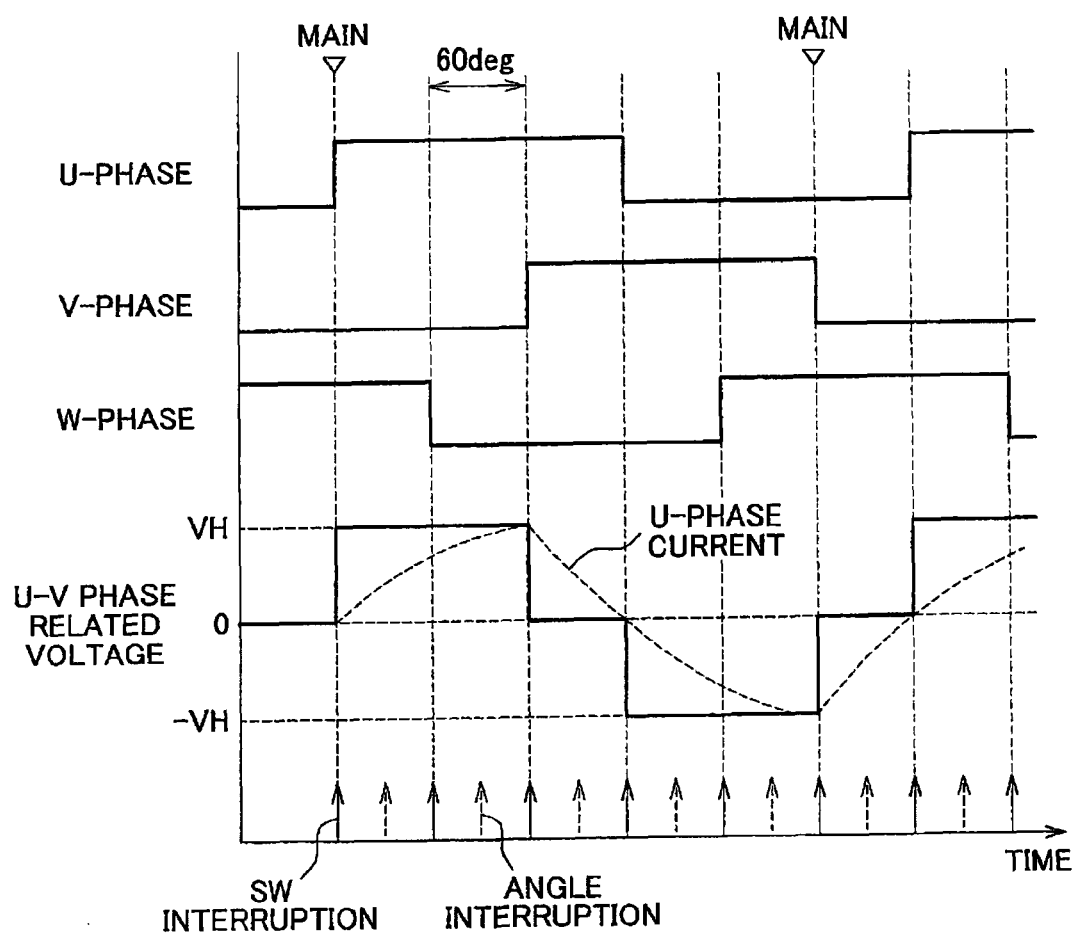
FIG. 5 is a view of the voltage waveform of each phase in one cycle of electrical angle in the rectangular wave voltage control mode in this example embodiment.

FIG. 5 is a view of the voltage waveform of each phase in one cycle (360 degrees) of electrical angle in the rectangular wave voltage control mode. Each phase (i.e., the U-phase, the V-phase, and the W-phase) voltage Vu, Vv, and Vw is a rectangular wave pulse in which the ratio of the high level time to the low level time for one pulse is 1:1, and has a phase difference of a 60 degree electrical angle. Therefore, the line voltage applied to the AC motor M1 is distorted instead of sinusoidal, with the system voltage VH as the amplitude. As a result, the motor current includes a distortion component instead of a sine wave.

In the rectangular wave voltage control mode, control of the rectangular wave voltage phase is executed by breaking down one cycle of electrical angle as an interruption in the main loop that is responsible for overall AC motor control. Incidentally, as illustrated in FIG. 3, the rectangular wave voltage control is executed in the high speed region, so the control cycle of the rectangular wave voltage phase is shorter than the control cycle of the main loop.

More specifically, referring to FIG. 5, an interruption for turning the switching elements of the inverter 14 on and off is executed according to an interruption generated every 60 degrees of electrical angle. Hereinafter, this interruption for turning the switching elements of the inverter 14 on and off may also be referred to as a "switching interruption", and the interruption for executing this switching interruption may also be referred to as a "switching interruption (SW interruption)".

When there is a switching interruption, the rectangular wave voltage control portion 400 executes feedback control that adjusts the phase of the rectangular wave voltage, according to the difference between the actual torque value and the torque command value, by performing the switching interruption described below.

More specifically, first the coordinate converting portion 410 (FIG. 4) samples the output of the current sensor 24 (FIG. 1) curing the current switching interruption. Then the coordinate converting portion 410 calculates a d-axis current Id and a q-axis current Iq based on the sampled motor current detected values iv and iw, according to a well-known three-phase→two-phase transformation.

Next, the torque estimating portion 420 (FIG. 4) estimates the output torque Tq of the AC motor M1 according to the method described above using the calculated d-axis current Id and the calculated q-axis current Iq. Then when the PI calculating portion 430 (FIG. 4) generates the voltage phase φv according to the difference ΔTrq between the torque estimated value Tq and the torque command value Trqcom, the rectangular wave generator 440 (FIG. 4) generates a switching control signal S3 to S8 for the inverter 14 to generate the rectangular wave voltage according to the voltage phase φv.

Figure 6A:
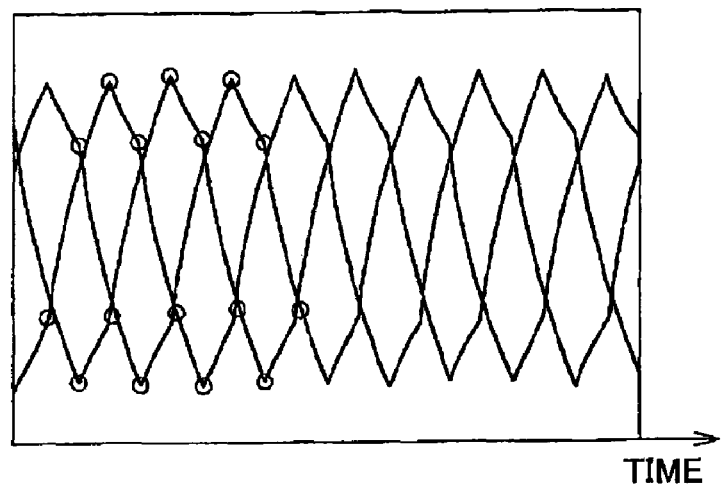
FIGS. 6A and 6B are views of the waveform of the motor current and the torque estimated value, respectively, when the typical rectangular wave voltage control mode according to the related art is selected.
Figure 6B:
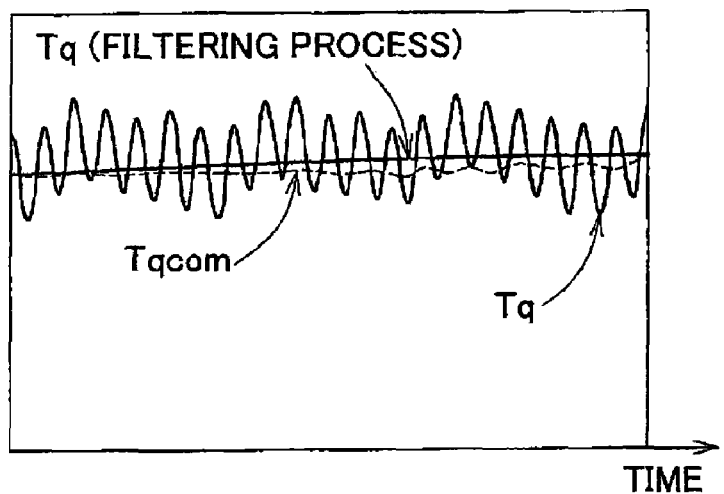

However, with a structure such as this in which the output of the current sensor 24 is sampled in the switching interruption, there is a problem of the estimation accuracy of the output torque of the AC motor M1 decreasing due to the distortion component in the motor current, as shown in FIGS. 6A and 6B.

Figure 8:
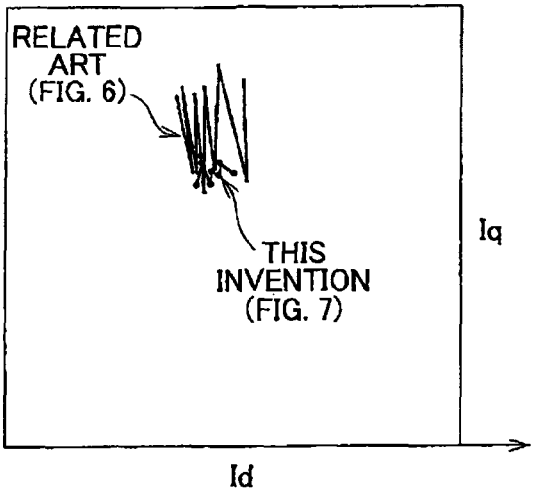
FIG. 8 is a view of the d-axis current and the q-axis current calculated based on the motor current shown in FIGS. 6A and 6B and FIGS. 7A and 7B.

FIG. 6A is a view of the waveforms of the motor currents (i.e., the V-phase current iv and the W-phase current iw) in the rectangular wave voltage control mode. The motor current includes a distortion component, not a sine wave. This distortion component appears noticeably when the switching elements of the inverter 14 are turned on and off. Therefore, with a structure that samples the motor current at each switching interruption, the points on the waveforms in FIG. 6A that are marked with a circle are sampled, so the sampled motor current detected values iv and iw reflect the distortion component. Accordingly, there is a large fluctuation, as shown in FIG. 8, in the d-axis current Id and the q-axis current Iq in which these motor current detected values iv and iw have undergone three-phase→two-phase transformation.

Also, FIG. 6B shows the torque Tq estimated using the d-axis current Id and the q-axis current Iq calculated based on the motor current detected values iv and iw sampled at each switching interruption. A cyclic fluctuation occurs in the torque estimated value Tq from the effect of the fluctuation in the d-axis current Id and the q-axis current Iq. When feedback control of the torque is performed according to the difference ΔTq between this torque estimated value Tq and the torque estimated value Tqcom, torque fluctuation may occur in the AC motor M1.

In order to suppress such a fluctuation in the torque estimated value Tq, it is effective to remove the distortion component from the motor current detected value iv and iw by performing a filtering process that smoothes the motor current detected values iv and iw sampled at each switching interruption in the direction of the temporal axis. FIG. 6B shows the torque Tq estimated using the filtered motor current detected values iv and iw, together with the torque Tq estimated using the motor current detected values iv and iw (the actual current). When these two torque estimated values Tq are compared, the torque fluctuation is suppressed in the torque estimated value Tq in which the motor current detected value has been filtered. As a result, it is evident that the torque difference ΔTq from the torque command value Tqcom is stable. Thus, the stability of the feedback control of the torque according to the torque difference ΔTq can be improved.

On the other hand, however, a delay occurs due to the time constant of the filter as a result of incorporating the filtering process for removing the distortion component of the motor current into the switching interruption in this way, so the control responsiveness may decrease. In particular, in the low speed region, the effect of the delay from the filtering process is especially remarkable because the control cycle of the switching interruption (which corresponds to a 60 degree electrical angle) is longer.

That is, in the filtering process, filtered motor current detected values ivf and iwf, which are the sampled motor current detected values iv and iw after they been temporally smoothed, are calculated according to Expression (4) below.

$$ivf = \{ivf - ivf(0)\} \times Ts/\tau + ivf \quad (4)$$

In Expression (4) above, ivf(0) is the last value of the filtered motor current detected value ivf, Ts is the sampling cycle of the motor current, and τ is the time constant of the filter. Of these, the sampling cycle of the motor current Ts is the control cycle of the switching interruption.

Here, in the low speed region, the control cycle of the switching interruption is longer than it is in the high speed region, so the delay from the filtering process is longer. On the other hand, if the time constant τ of the filter is small, the effect from the distortion component in the motor current is unable to be suppressed, so torque fluctuation may occur in the AC motor M1.

Even though the effect from the delay by the filtering process can be reduced with a control structure that executes the motor current sampling and the filtering process in parallel, the load on the ECU that forms the control structure becomes exceedingly high. Incidentally, this kind of parallel processing can be executed by making the ECU more complex, but this may increase the cost of the apparatus.

Therefore, in the rectangular wave voltage control according to this example embodiment, a new angle interruption is generated between switching interruptions and an interruption to sample the motor current is performed during that angle interruption in order to effectively remove the distortion component from the motor current without using the filtering process. An example in which an angle interruption is performed between SW interruptions is shown in FIG. 5, for example.

Figure 7A:
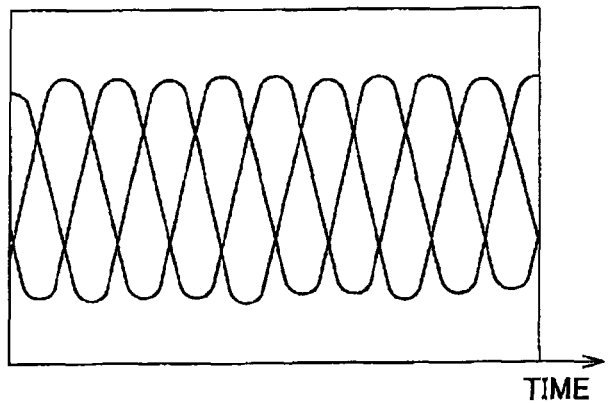
FIGS. 7A and 7B are views of the waveform of the motor current and the torque estimated value, respectively, when the rectangular wave voltage control mode according to the example embodiment of the invention is selected.

FIG. 7A is a view of the waveform of an equivalent motor current (i.e., the V-phase current iv and the W-phase current iw) calculated based on the motor current detected value sampled at each angle interruption shown in FIG. 5. Compared with the motor current (i.e., the actual motor current) shown in FIG. 6A, this equivalent motor current more closely approximates a sine wave. Also, the fluctuation in the d-axis current Id and the q-axis current Iq calculated based on this equivalent motor current is reduced, as shown in FIG. 8.

Figure 7B:
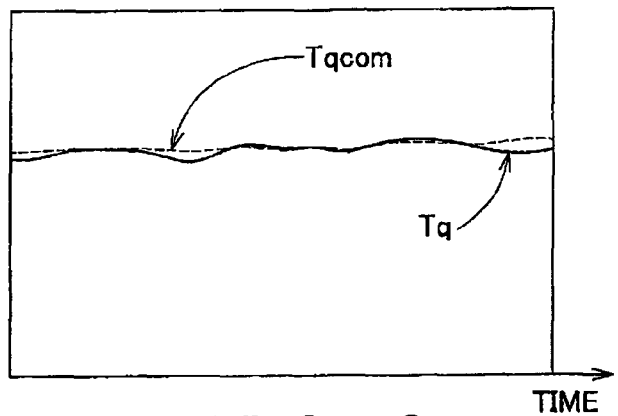

FIG. 7B is a view of the waveform of the torque Tq estimated using the d-axis current Id and the q-axis current Iq calculated based on the motor current detected values iv and iw sampled at each angle interruption. Fluctuation in the torque estimated value Tq is suppressed because the fluctuation in the d-axis current Id and the q-axis current Iq is reduced. Therefore, the difference ΔTq between this torque estimated value Tq and the torque estimated value Tqcom is stable, so the stability of the feedback control of the torque according to the torque difference ΔTq is able to be increased.

Here, in this structure, in order to remove distortion as well as or better than it is when the filtering process described above is performed, it is effective to increase the number of times the motor current is sampled by increasing the number of angle interruptions between switching interruptions.

Incidentally, the processing times of the switching interruption and the angle interruption are constant regardless of the motor speed. On the other hand, the time corresponding to one cycle of electrical angle becomes longer as the motor speed decreases. Therefore, if the rotation speed of the AC motor M1 is low, the load on the ECU will not increase even if the number of angle interruptions is increased.

Therefore, in this example embodiment, the number of angle interruptions between switching interruptions is set to vary according to the rotation speed of the AC motor M1. As a result, the distortion component can be effectively removed from the motor current without increasing the load on the ECU. Accordingly, it is not necessary to make the ECU more complex in order to ensure the estimation accuracy of the output torque of the AC motor M1. As a result, both control stability and control responsiveness of the rectangular wave voltage control can be increased with a simple structure.

Figure 9:
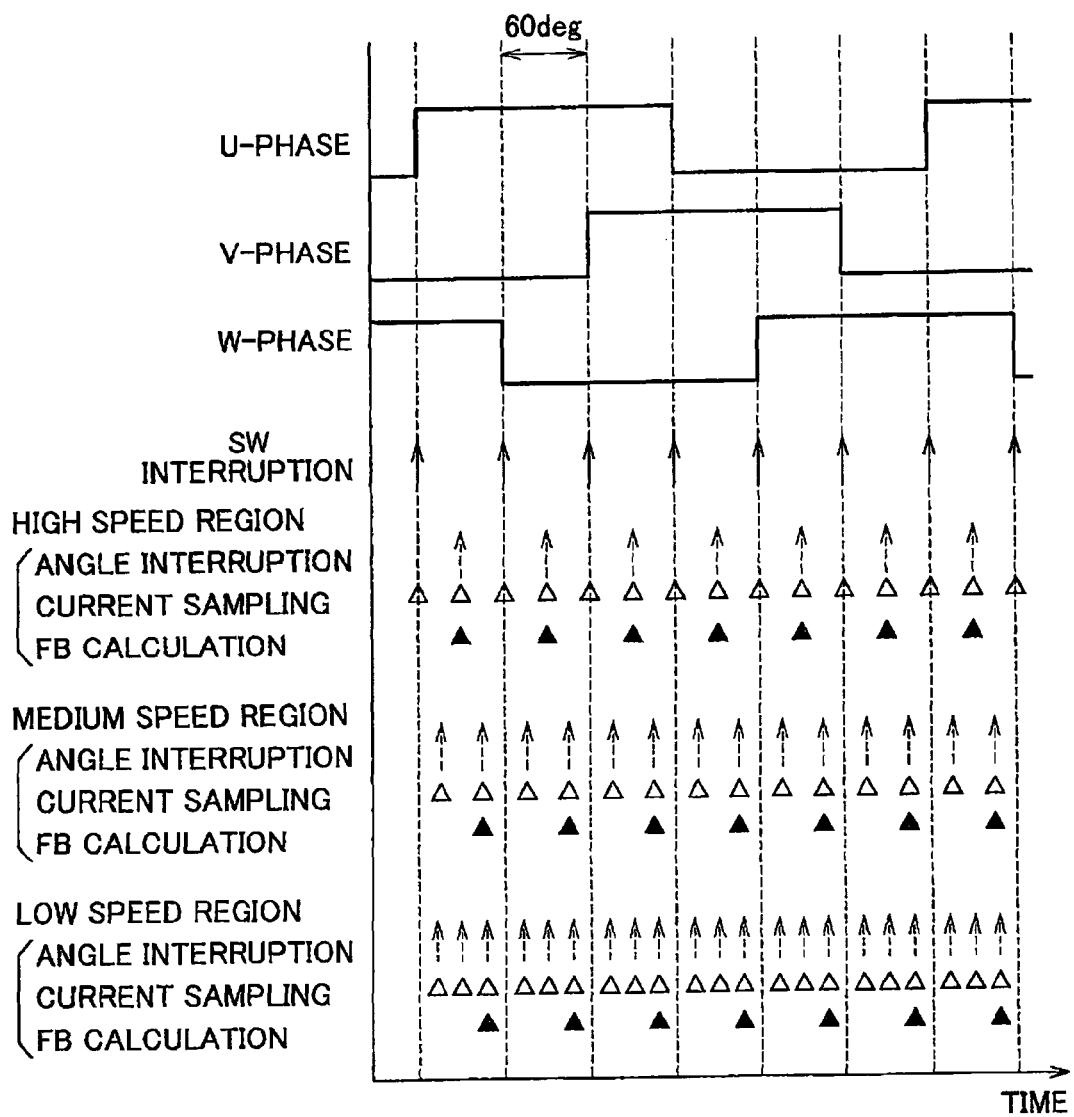
FIG. 9 is a view of a switching interruption and an angle interruption in the rectangular wave voltage control according to this example embodiment.

FIG. 9 is a view of a switching interruption and an angle interruption in the rectangular wave voltage control according to this example embodiment.

Referring to FIG. 9, the switching interruption is set for every 60 degrees of electrical angle. In contrast, the number of angle interruptions between switching interruptions is set to vary according to the rotation speed of the AC motor M1. As an example, in FIG. 9, the number of angle interruptions is set to a different value for each of the three speed regions (i.e., the high speed region, the medium speed region, and the low speed region) of the AC motor M1.

More specifically, in the high speed region, one angle interruption is provided between switching interruptions, while in the medium speed region, two angle interruptions are provided between switching interruptions, and in the low speed region, three angle interruptions are provided between switching interruptions. That is, the number of angle interruptions is set to increase as the rotation speed of the AC motor M1 decreases.

Incidentally, with this kind of structure, in the high speed region, either the switching interruption or the angle interruption is executed every 30 degrees of electrical angle. Also, in the medium speed region, either the switching interruption or the angle interruption is executed every 20 degrees of electrical angle. Moreover, in the low speed region, either the switching interruption or the angle interruption is executed every 15 degrees of electrical angle.

In addition, in this example embodiment, in the structure described above, motor current sampling during a switching interruption is prohibited in the medium and low speed regions. That is, in the medium and low speed regions, the motor current is only sampled in the plurality of angle interruptions provided between switching interruptions.

Prohibiting the motor current from being sampled during a switching interruption in the medium and low speed regions in this way is done because the distortion component generated when the switching elements of the inverter 14 are turned on and off increases as the rotation speed of the AC motor M1 decreases. That is, the output torque in the medium and low speed regions is relatively large compared to the output torque in the high speed region. Therefore, a larger motor current passes through the AC motor M1. At this time, the inductance of the AC motor M1 decreases as the motor current increases, so the distortion component generated when the switching elements are turned on and off increases as the speed decreases. Thus, prohibiting the motor current from being sampled during a switching interruption enables the distortion component in the motor current to be effectively removed. As a result, the estimation accuracy of the output torque of the AC motor M1 can be improved.

Incidentally, the structure described in this example embodiment prohibits the motor current from being sampled during a switching interruption. However, as long as the motor current detected value that is sampled during a switching interruption is offset, a structure that does not use the motor current detected value sampled during a switching interruption in a motor current detected value averaging process, which will be described later, may be used instead.

Also, in this example embodiment, the structure described above performs a feedback control calculation of the phase φv of the rectangular wave voltage according to the torque difference ΔTq during the last or final angle interruption, from among at least one angle interruption between switching interruptions.

That is, referring to FIG. 9, in the high speed region the feedback control calculation is performed during one angle interruption, in the medium speed region the feedback control calculation is performed during the last of two angle interruptions, and in the low speed region the feedback control calculation is performed during the last of the three angle interruption.

Incidentally, hereinafter for the sake of simplicity, the last angle interruption, from among at least one angle interruption between switching interruptions will be referred to as a "feedback angle interruption (FB angle interruption)" that serves as an angle interruption for the sampling the motor current and performing the feedback control calculation. On the other hand, all of the other angle interruptions except for the last angle interruption will be referred to as intermediate angle interruptions that serve as angle interruptions for sampling the motor current.

When calculating the torque estimated Tq in the feedback angle interruption, the d-axis current id and the q-axis current iq calculated based on the motor current detected values iv and iw sampled at each angle interruption are averaged. As a result, the distortion component in the motor current can be removed without increasing the load on the ECU compared to the related filtering process described above.

More specifically, in the high speed region, only one angle interruption is performed between switching interruptions. Therefore, the d-axis current id_sw calculated based on the motor current detected values iv and iw during the last (i.e., the most recent) switching interruption and the d-axis current id_fb calculated based on the motor current detected values iv and iw during the current feedback angle interruption are averaged according to Expression (5) below. Similarly, the q-axis current iq_sw calculated based on the motor current detected values iv and iw during the last (i.e., the most recent) switching interruption and the q-axis current iq_fb calculated based on the motor current detected values iv and iw during the current feedback angle interruption are averaged according to Expression (6) below.

$$Id = (id\_sw + id\_fb)/2 \quad (5)$$

$$Iq = (iq\_sw + iq\_fb)/2 \quad (6)$$

On the other hand, in the low speed region, the d-axis current id_cent1 calculated based on the motor current detected values during the next-to-last intermediate angle interruption, the d-axis current id_cent2 calculated based on the motor current detected values during the last (i.e., the most recent) intermediate angle interruption, and the d-axis current id_fb calculated based on the motor current detected values iv and iw during the current feedback angle interruption are averaged according to Expression (7). Similarly, the q-axis current iq_cent1 calculated based on the motor current detected values during the next-to-last intermediate angle interruption, the q-axis current iq_cent2 calculated based on the motor current detected values during the last (i.e., the most recent) intermediate angle interruption, and the q-axis current iq_fb calculated based on the motor current detected values iv and iw during the current feedback angle interruption are averaged according to Expression (8) below.

$$Id = (id\_cent1 + id\_cent2 + id\_fb)/3 \quad (7)$$

$$Iq = (iq\_cent1 + iq\_cent2 + iq\_fb)/3 \quad (8)$$

Also, in the medium speed region as well, the d-axis current id_cent1 calculated based on the motor current detected values during the last (i.e., the most recent) intermediate angle interruption and the d-axis current id_fb calculated based on the motor current detected values iv and iw during the current feedback angle interruption are averaged according to the same method that is used in the low speed region. Similarly, the q-axis current iq_cent1 calculated based on the motor current detected values during the last (i.e., the most recent) intermediate angle interruption and the q-axis current iq_fb calculated based on the motor current detected values iv and iw during the current feedback angle interruption are averaged according to the same method that is used in the low speed region.

Once the d-axis current id and the q-axis current Iq are calculated by the averaging process described above, the torque estimated value Tq is calculated using this d-axis current Id and the d-axis current Iq. Then the feedback control calculation of the phase φv of the rectangular wave voltage is executed according to the difference ΔTq between the torque estimated value Tq and the torque estimated value Tqcom.

Incidentally, in this example embodiment, the d-axis current Id is calculated by averaging the d-axis current id based on the motor current detected values iv and iw at each angle interruption, and the q-axis current Iq is calculated by averaging the q-axis current iq based on the motor current detected values iv and iw at each angle interruption. Alternatively, however, the d-axis current Id may be calculated by a filtering process that averages the d-axis current id in the direction of the temporal axis, and the q-axis current Iq may be calculated by a filtering process that averages the q-axis current iq in the direction of the temporal axis.

The current sensor 24 shown in FIGS. 1 and 4 corresponds to one example of a current detector, the rotation angle sensor 25 corresponds to one example of a position detector, and the control apparatus 30 and the rectangular wave voltage control portion 400 correspond to one example of a rectangular wave voltage control portion.

Figure 10:
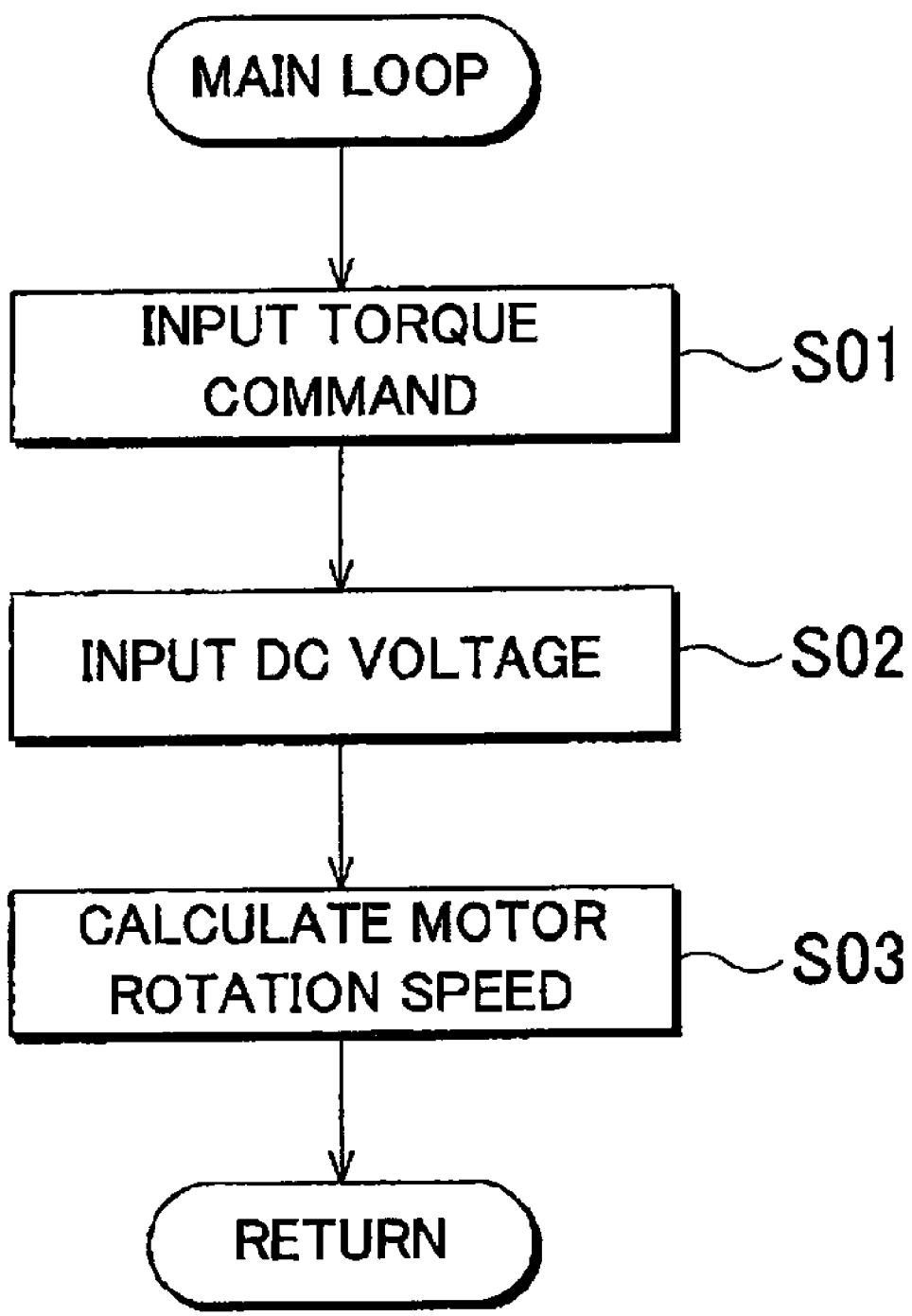
FIG. 10 is a flowchart illustrating a main loop routine responsible for overall alternating-current motor control.

The processes described above can be summarized in the routine shown in FIGS. 10 to 14. FIG. 10 is a flowchart illustrating a main loop routine responsible for overall AC motor control. Incidentally, the steps in the flowchart shown in FIG. 10 are realized by executing a main loop program stored in advance in the control apparatus 30 in a predetermined control cycle. Alternatively, some of the steps may be realized using special hardware (electronic circuits) provided for that purpose.

Referring to FIG. 10, the control apparatus 30 first inputs the torque command value Tqcom from a host ECU that controls the overall electric vehicle provided with the motor drive system 100 (FIG. 1) (step S01). Incidentally, the torque command value Tqcom is calculated according to the overall output required to run the electric vehicle, which is calculated based on the running state of the vehicle (i.e., such as whether the vehicle is accelerating or decelerating) and commands by the driver, which include the depression amount of the accelerator pedal, the depression amount of the brake pedal, and the shift lever position.

Next, the control apparatus 30 generates, according to the input torque command value Tqcom, a control command according to the demand and supply of power in the electric vehicle, and supplies a predetermined amount of discharged energy to the AC motor M1 from the DC voltage generating portion 10# (step S02).

Finally, the control apparatus 30 calculates the rotation speed (rpm) and angular velocity of the AC motor M1 based on the rotation angle θ from the rotation angle sensor 25 (step S03).

Figure 11:
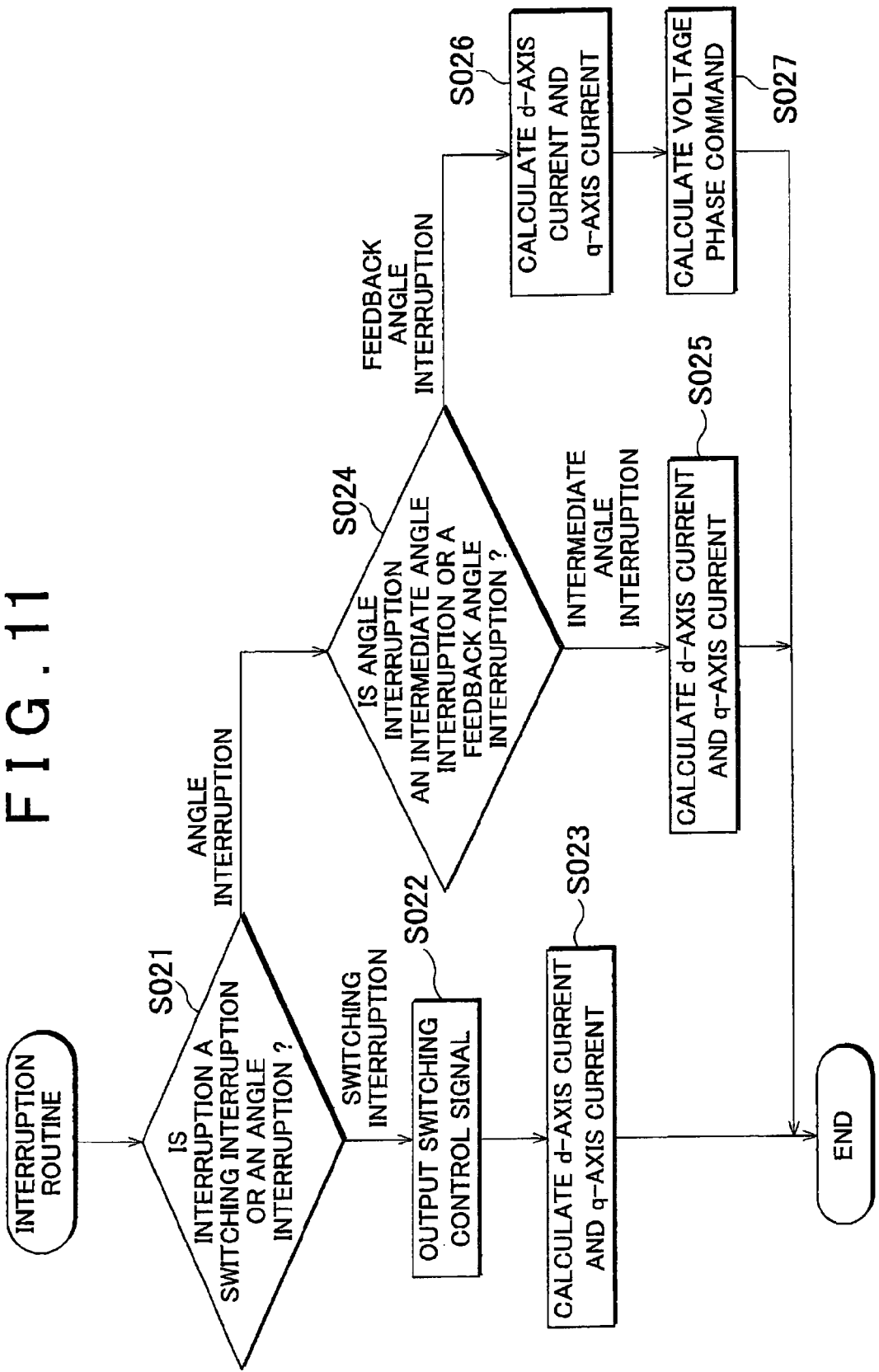
FIG. 11 is a flowchart illustrating an interruption routine with respect to the main loop shown in FIG. 10.

FIG. 11 is a flowchart illustrating an interruption routine with respect to the main loop shown in FIG. 10. The steps in the flowchart shown in FIG. 11 are realized by executing an interruption program that has been stored in advance in the control apparatus 30 in a predetermined cycle in which one cycle of electrical angle has been broken down, when the rectangular wave voltage control mode is selected. Alternatively, some of the steps may be realized using special hardware (electronic circuits) provided for that purpose.

Referring to FIG. 11, the rectangular wave voltage control portion 400 determines whether the current interruption is a switching interruption or an angle interruption (step S021). If the current interruption is a switching interruption, the rectangular wave voltage control portion 400 outputs a switching control signal S3 to S8 of the inverter 14 to generate a rectangular wave voltage of a voltage phase φv such that the AC motor M1 will output torque according to the torque command value Tqcom (step S022). In addition, the rectangular wave voltage control portion 400 samples the output of the current sensor 24 (FIG. 1) and calculates the d-axis current id_sw and the q-axis current iq_sw based on the sampled motor current detected values iv and iw, according to a well-known three-phase→two-phase transformation (step S023). Incidentally, in step S023, the calculated d-axis current id_sw and q-axis current iq_sw may also be offset according to the rotation speed of the AC motor M1.

On the other hand, if the current interruption is an angle interruption, the rectangular wave voltage control portion 400 further determines whether that angle interruption is an intermediate angle interruption or a feedback angle interruption (step S024). If it is an intermediate angle interruption, the rectangular wave voltage control portion 400 samples the output of the current sensor 24 (FIG. 1) and calculates the d-axis current id_cent and the q-axis current iq_cent based on the sampled motor current detected values iv and iw, according to a well-known three-phase→two-phase transformation (step S025).

If, on the other hand, the angle interruption is a feedback angle interruption, the rectangular wave voltage control portion 400 samples the output of the current sensor 24 (FIG. 1) and calculates the d-axis current id_fb and the q-axis current iq_fb based on the sampled motor current detected values iv and iw, according to a well-known three-phase→two-phase transformation (step S026). Once the rectangular wave voltage control portion 400 calculates the d-axis current Id by averaging the d-axis current id calculated at each angle interruption and calculates the q-axis current Iq by averaging the q-axis current iq calculated at each angle interruption, the rectangular wave voltage control portion 400 then estimates the output torque Tq of the AC motor M1 using this d-axis current Id and this q-axis current Iq. Then the rectangular wave voltage control portion 400 executes a feedback control calculation of the phase φv of the rectangular wave voltage according to the difference ΔTq between the torque estimated value Tq and the torque estimated value Tqcom (step S027).

Hereinafter, the detailed routines of the switching interruption, the intermediate angle interruption, and the feedback angle interruption, all of which are shown in FIG. 11, will be described.

Figure 12:
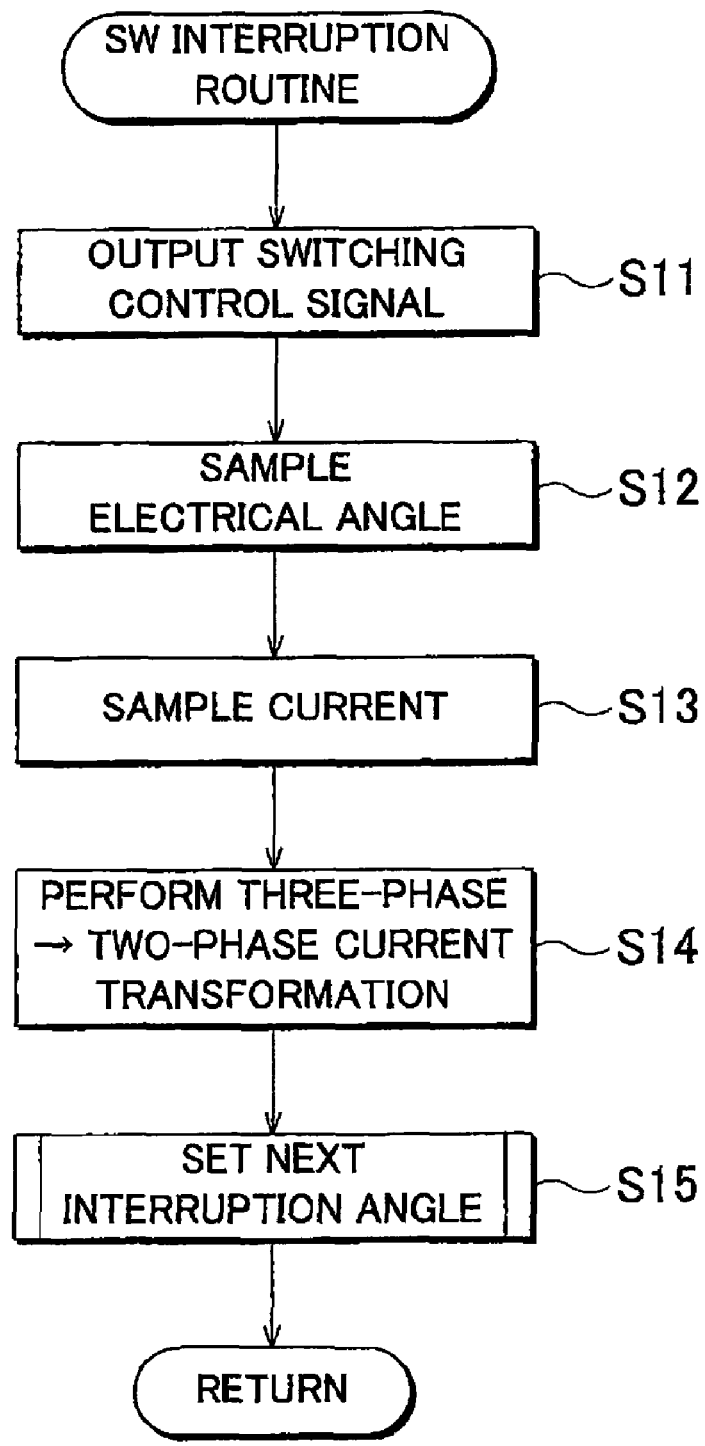
FIG. 12 is a flowchart illustrating a switching interruption routine in this example embodiment.

FIG. 12 is a flowchart illustrating a switching interruption routine. Referring to FIG. 12, the rectangular wave voltage control portion 400 outputs the switching control signal S3 to S8 of the inverter 14 to generate rectangular wave voltage of a phase current φv such that the AC motor M1 will output torque according to the torque command value Tqcom (step S11).

Next, the rectangular wave voltage control portion 400 samples the rotation angle θ of the AC motor M1 detected by the rotation angle sensor 25. Then the rectangular wave voltage control portion 400 obtains an electrical angle detected value φ of the AC motor M1 by integrating the sampled rotation angle θ and the pairs of poles p (step S12).

Also, the rectangular wave voltage control portion 400 samples the motor currents iv and iw detected by the current sensor 24 and obtains the motor current detected values iv and iw (step S13). Then the rectangular wave voltage control portion 400 calculates the d-axis current id_sw and the q-axis current iq_sw according to a well-known three-phase→two-phase transformation, based on the sampled motor current detected values iv and iw (step S14).

Finally, the rectangular wave voltage control portion 400 sets the interruption angle which is an electrical angle specifying the next angle interruption (step S15). This next interruption angle is set variably according to the rotation speed of the AC motor M1 according to a routine that will be described later.

Figure 13:
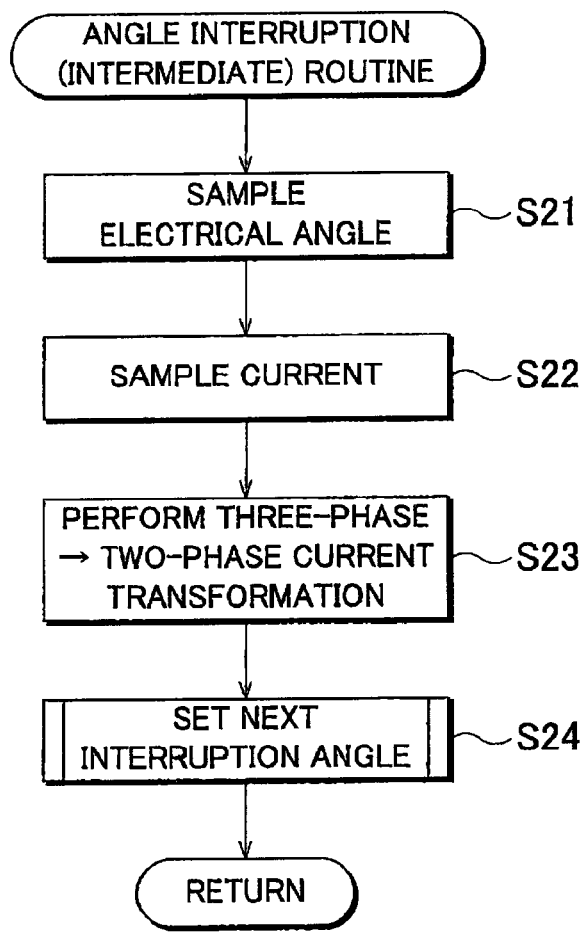
FIG. 13 is a flowchart illustrating an intermediate angle interruption routine in this example embodiment.

FIG. 13 is a flowchart illustrating an intermediate angle interruption routine. Referring to FIG. 13, the rectangular wave voltage control portion 400 samples the rotation angle θ of the AC motor M1 detected by the rotation angle sensor 25, and then obtains the electrical angle detected value φ of the AC motor M1 by integrating that sampled rotation angle θ and the pairs of poles p of the AC motor M1 (step S21).

Next, the rectangular wave voltage control portion 400 samples the motor currents iv and iw detected by the current sensor 24 and obtains the motor current detected values iv and iw (step S22). Once this is done, the rectangular wave voltage control portion 400 calculates the d-axis current id_sw and the q-axis current iq_sw according to a well-known three-phase→two-phase transformation, based on the motor current detected values iv and iw (step S23).

Finally, the rectangular wave voltage control portion 400 sets the interruption angle which is the electrical angle specifying the next angle interruption (step S24). This next interruption angle is set variably according to the rotation speed of the AC motor M1.

Figure 14:
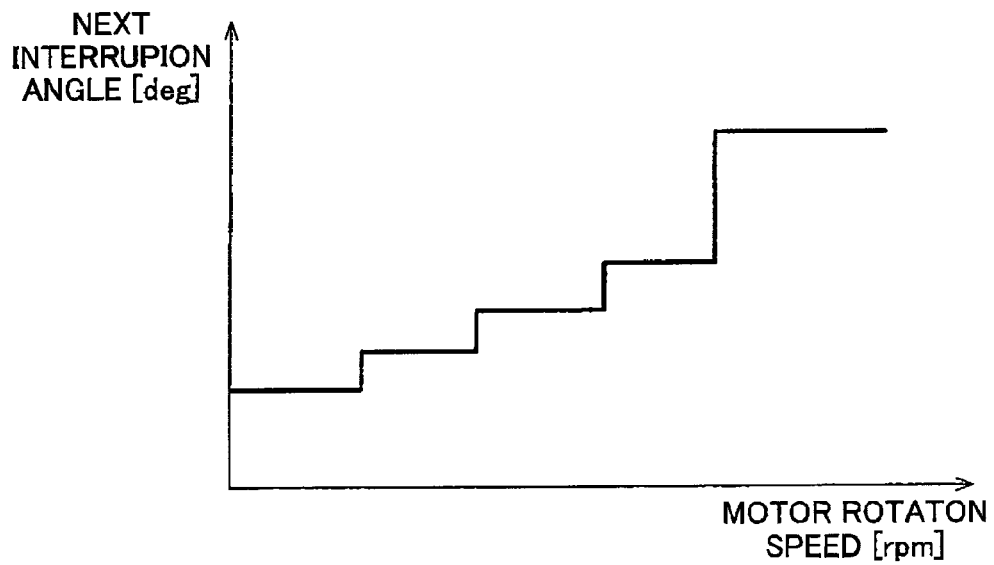
FIG. 14 is a graph showing the relationship between the rotation speed of the alternating-current motor and the next interruption angle.

FIG. 14 is a graph showing the relationship between the rotation speed of the AC motor and the next interruption angle. Referring to FIG. 14, the next interruption angle is set to become smaller as the rotation speed of the AC motor M1 decreases. As a result, the number of angle interruptions can be made to vary according to the rotation speed of the AC motor M1, as shown in FIG. 9.

Incidentally, the rectangular wave voltage control portion 400 stores the relationship shown in FIG. 14 in a map in ROM (Read Only Memory), not shown, as a map for setting the next interruption angle beforehand, and sets the next interruption angle based on the rotation speed of the AC motor M1 using this map read from the ROM during a switching interruption or the intermediate angle interruption.

Figure 15:
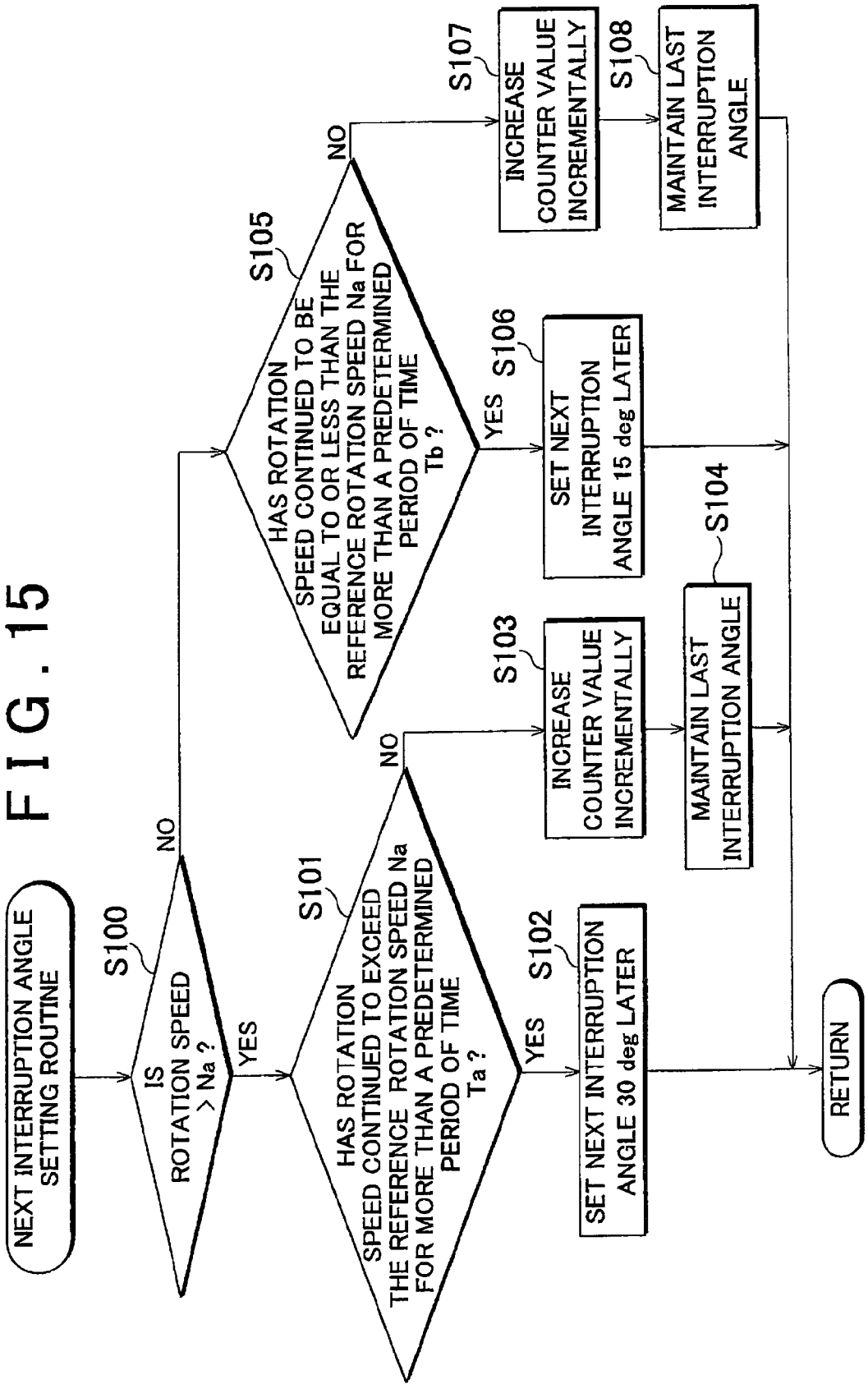
FIG. 15 is a flowchart illustrating the details of a next interruption angle setting routine in FIGS. 12 and 13.

FIG. 15 is a flowchart illustrating the details of a next interruption angle setting routine in FIGS. 12 and 13. Incidentally, in FIG. 15, a routine when switching the next interruption angle between a 30 degree electrical angle and a 15 degree electrical angle according to the rotation speed of the AC motor M1 will be described as an example.

Referring to FIG. 15, once the rectangular wave voltage control portion 400 calculates the current rotation speed of the AC motor M1 based on the rotation angle θ from the rotation angle sensor 25, the rectangular wave voltage control portion 400 then determines whether that calculated rotation speed exceeds a predetermined reference rotation speed Na set in advance (step S100). If the calculated rotation speed exceeds the reference rotation speed Na (i.e., Yes in step S100), the rectangular wave voltage control portion 400 determines whether the calculated rotation speed has continued to exceed the reference rotation speed Na for more than a predetermined period of time Ta (step S101).

More specifically, the rectangular wave voltage control portion 400 has a counter circuit inside. If it is determined that the rotation speed of the AC motor M1 exceeds the reference rotation speed Na, the counter value increases incrementally. If, on the other hand, it is determined that the rotation speed is equal to or less than the reference rotation speed Na, the counter value is reset. In this way, the rectangular wave voltage control portion 400 increases the counter value incrementally or resets it, depending on the comparison result between the rotation speed of the AC motor M1 and the reference rotation speed Na at each interruption. Then when the counter value exceeds a preset reference value, it is determined that the rotation speed has continued to exceed the reference rotation speed Na for more than the predetermined period of time Ta.

Then, if the rotation speed has continued to exceed the reference rotation speed Na for more than the predetermined period of time Ta (i.e., YES in step S101), the rectangular wave voltage control portion 400 sets the next interruption angle so that it is 30 degrees of electrical angle after the current electrical angle (step S102).

If, on the other hand, the rotation speed has not continued to exceed the reference rotation speed Na for more than the predetermined period of time Ta (i.e., NO in step S101), the rectangular wave voltage control portion 400 increases the counter value incrementally (step S103) and maintains the last interruption angle (step S104).

In contrast, if the rotation speed is equal to or less than the reference rotation speed Na (i.e., NO in step S100), the rectangular wave voltage control portion 400 determines whether the rotation speed has continued to be equal to or less than the reference rotation speed Na for more than a predetermined period of time Tb (step S105).

More specifically, if it is determined that the rotation speed of the AC motor M1 is equal to or less than the reference rotation speed Na, the rectangular wave voltage control portion 400 increases the counter value of the counter circuit incrementally. If, on the other hand, it is determined that the rotation speed exceeds the reference rotation speed Na, the rectangular wave voltage control portion 400 resets the counter value. In this way, the rectangular wave voltage control portion 400 increases the counter value incrementally or resets it, depending on the comparison result between the rotation speed of the AC motor M1 and the reference rotation speed Na at each interruption. Then when the counter value exceeds a preset reference value, it is determined that the rotation speed has continued to exceed the reference rotation speed Na for more than the predetermined period of time Tb.

Then, if the rotation speed has continued to be equal to or less than the reference rotation speed Na for more than the predetermined period of time Tb (i.e., YES in step S105), the rectangular wave voltage control portion 400 sets the next interruption angle so that it is 15 degrees of electrical angle after the current electrical angle (step S106).

If, on the other hand, the rotation speed has not continued to be equal to or less than the reference rotation speed Na for more than the predetermined period of time Tb (i.e., NO in step S105), the rectangular wave voltage control portion 400 increases the counter value incrementally (step S107) and maintains the last interruption angle (step S108).

Incidentally, the predetermined period of time Ta in step S101 in FIG. 15 and the predetermined period of time Tb in step S105 in FIG. 15 are set such that the predetermined period of time Tb is shorter than the predetermined period of time Ta.

This is because in the low speed region, the output torque of the AC motor M1 is larger than it is in the high speed region, so the rate of change in the rotation speed is relatively fast.

As described above, switching the next interruption angle provides hysteresis for the period of time during which the comparison result between the rotation speed of the AC motor M1 and the reference rotation speed Na remains the same, which makes it possible to prevent chattering in which the interruption angle repeatedly switches between SW interruptions when the rotation speed of the AC motor M1 suddenly changes due to a sudden acceleration or deceleration demand by the driver, for example.

Incidentally, instead of providing hysteresis for the period of time during which the comparison result between the rotation speed of the AC motor M1 and the reference rotation speed Na remains the same, it is of course also possible to prevent chattering of the interruption angle by providing hysteresis for the reference rotation speed Na.

Figure 16:
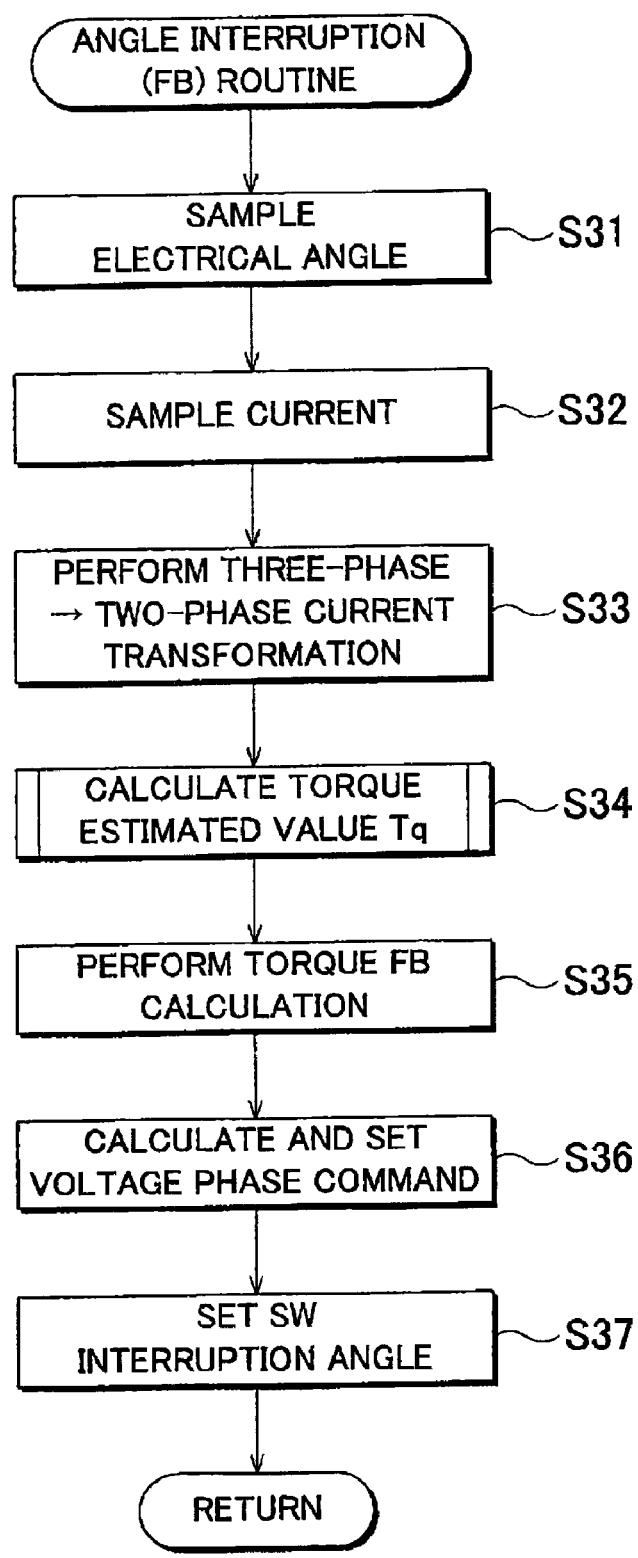
FIG. 16 is a flowchart illustrating a feedback angle interruption routine in this example embodiment.

FIG. 16 is a flowchart illustrating a feedback angle interruption routine. Referring to FIG. 16, the rectangular wave voltage control portion 400 samples the rotation angle θ of the AC motor M1 detected by the rotation angle sensor 25, and obtains the electrical angle detected value ϕ of the AC motor M1 by integrating that sampled rotation angle θ and the pairs of poles p (step S31).

Also, after the rectangular wave voltage control portion 400 samples the motor currents iv and iw detected by the current sensor 24 and obtains the motor current detected value iv and iw (step S32), the rectangular wave voltage control portion 400 then calculates the d-axis current id_sw and the q-axis current iq_sw according to a well-known three-phase→two-phase transformation, based on the motor current detected values iv and iw.

Then once the rectangular wave voltage control portion 400 calculates the d-axis current Id by averaging the d-axis current id calculated at each angle interruption and calculates the q-axis current Iq by averaging the q-axis current iq calculated at each angle interruption, the rectangular wave voltage control portion 400 calculates the estimated torque value using this d-axis current Id and this q-axis current Iq (step S34).

Figure 17:
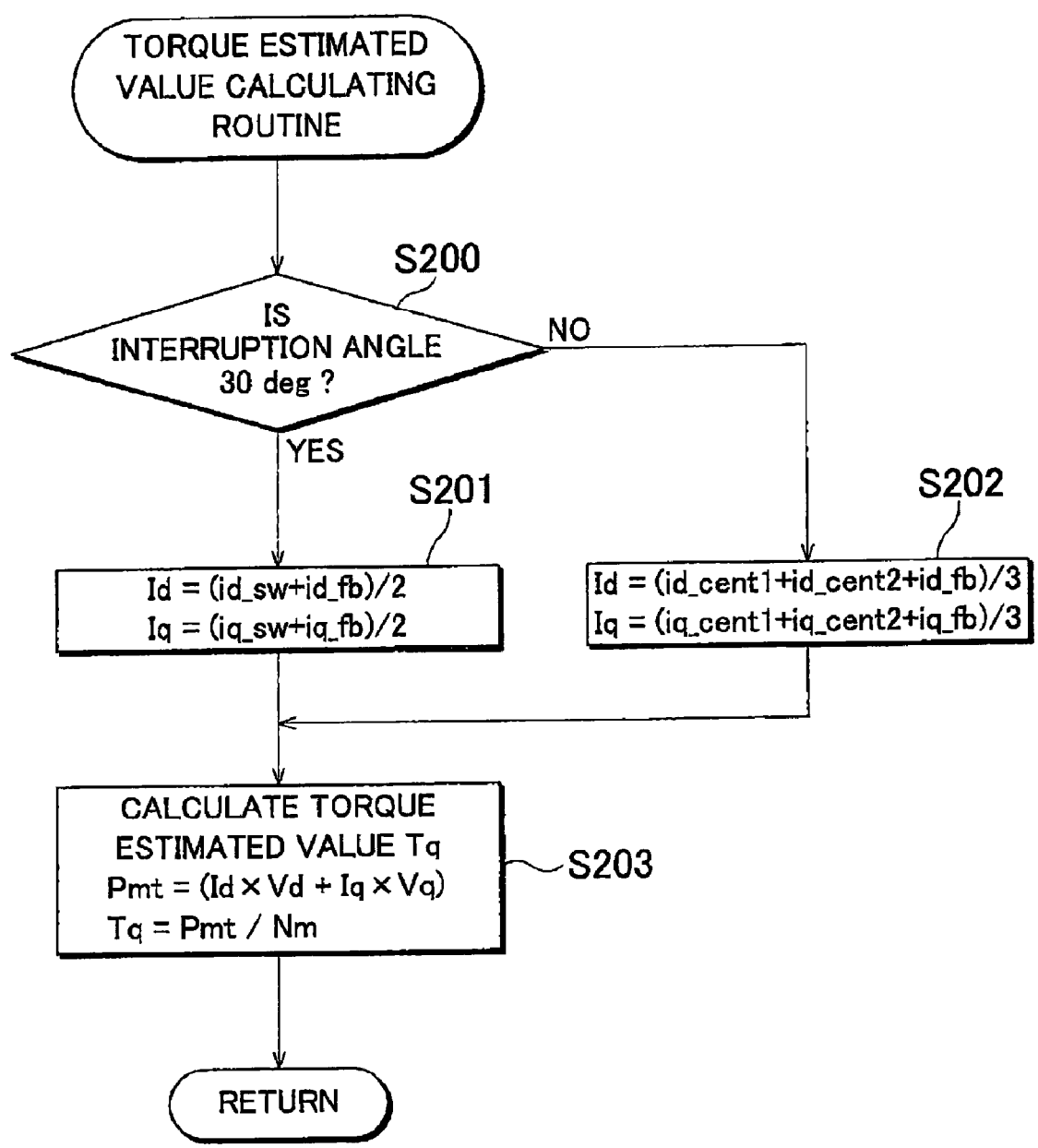
FIG. 17 is a flowchart illustrating the details of a torque estimated value calculating routine in FIG. 16.

FIG. 17 is a flowchart illustrating the details of a torque estimated value calculating routine in FIG. 16. Incidentally, in FIG. 17, a routine when switching the next interruption angle between a 30 degree electrical angle and a 15 degree electrical angle according to the rotation speed of the AC motor M1 will be described as an example.

Referring to FIG. 17, the rectangular wave voltage control portion 400 determines whether the current interruption angle is a 30 degree electrical angle (step S200). If, the current interruption angle is a 30 degree electrical angle (i.e., YES in step S200), the rectangular wave voltage control portion 400 averages the d-axis current id_sw calculated based on the motor current detected values iv and iw in the last switching interruption and the d-axis current id_fb calculated based on the motor current detected values iv and iw in the current feedback angle interruption according to Expression (5) above, and similarly, averages the q-axis current iq_sw calculated based on the motor current detected values iv and iw in the last switching interruption and the q-axis current iq_fb calculated based on the motor current detected values iv and iw in the current feedback angle interruption according to Expression (6) above (step S201).

If, on the other hand, the current interruption angle is not a 30 degree electrical angle (i.e., NO in step S200), i.e., if the current interruption angle is a 15 degree electrical angle, the rectangular wave voltage control portion 400 averages the d-axis current id_cent1 calculated based on the motor current detected values in the next-to-last intermediate angle interruption, the d-axis current id_cent2 calculated based on the motor current detected values in the last intermediate angle interruption, and the d-axis current id_fb calculated based on the motor current detected values iv and iw in the current feedback angle interruption according to Expression (7) above, and similarly, averages the q-axis current iq_cent1 calculated based on the motor current detected values in the next-to-last intermediate angle interruption, the q-axis current iq_cent2 calculated based on the motor current detected values in the last intermediate angle interruption, and the q-axis current iq_fb calculated based on the motor current detected values iv and iw in the current feedback angle interruption according to Expression (8) above (step S202).

Then once the d-axis current Id and the q-axis current Iq have been calculated by the averaging processes in step S201 and S202, the rectangular wave voltage control portion 400 calculates the torque estimated value Tq according to Expressions (1) and (2) above using this d-axis current Id and this q-axis current Iq (step S203).

Referring back to FIG. 16 again, the rectangular wave voltage control portion 400 obtains the control difference between the torque estimated value Tq and the torque estimated value Tqcom by performing a PI calculation according to a predetermined gain (step S35), and calculates and sets the voltage phase command ϕv of the rectangular wave voltage according to the obtained control difference (step S36).

Finally, the rectangular wave voltage control portion 400 sets the switching interruption angle which is the electrical angle specifying the next switching interruption (step S37).

As described above, according to this example embodiment, the sampling accuracy of the motor current that flows through the AC motor M1 is able to be ensured without using a filtering process, by setting the interruption angle in the angle interruption so that the number of angle interruptions between switching interruptions varies according to the rotation speed of the AC motor M1. As a result, both control stability and control responsiveness of the rectangular wave voltage control can be increased with a simple structure.

Incidentally, in this example embodiment, a structure in which the DC voltage generating portion 10# of the motor drive system includes the step-up/down converter 12 so that the voltage input to the inverter 14 (i.e., the system voltage VH) can be variably controlled is described as a preferable structure. However, as long as the voltage input to the inverter 14 can be variably controlled, the structure of the DC voltage generating portion 10# is not limited to that described in the example embodiment. Also, it is not absolutely essential that the voltage input to the inverter be variable. That is, the invention may also be applied to a structure in which the output voltage of the DC power supply B is input to the inverter 14 as it is (e.g., a structure in which the step-up/down converter 12 is omitted).

Furthermore, in this example embodiment, it is assumed that the alternating-current motor that is the load on the motor drive system is a permanent-magnet motor provided for driving a vehicle (such as a hybrid vehicle or an electric vehicle). However, the invention may also be applied to a structure in which the load is any appropriate alternating-current motor that can be used in other equipment.

The example embodiments disclosed herein are in all respects merely examples and should in no way be construed as limiting. The scope of the invention is indicated not by the foregoing description but by the scope of the claims for patent, and is intended to include all modifications that are within the scope and meanings equivalent to the scope of the claims for patent.

What is claimed is:

1. A control apparatus for an alternating-current motor in which applied current is controlled by an inverter, comprising:
    a current detector that detects current flowing between the inverter and the alternating-current motor;
    a position detector that detects a rotational position of the alternating-current motor; and
    a rectangular wave voltage control portion that generates a control command for the inverter such that rectangular wave voltage that has been phase-controlled to make the alternating-current motor operate according to an operation command is applied to the alternating-current motor,
    wherein the rectangular wave voltage control portion includes i) a torque estimating portion that estimates the output torque of the alternating-current motor based on the output of the current detector and the output of the position detector, ii) a voltage phase controlling portion that determines the phase of the rectangular wave voltage according to a difference between the torque estimated by the torque estimating portion and a torque command value, and iii) a voltage controlling portion that controls a voltage conversion in the inverter such that rectangular wave voltage according to the phase determined by the voltage phase controlling portion is applied to the alternating-current motor, and
    wherein every predetermined first electrical angle that is set in advance, the torque estimating portion executes an angle interruption that samples the phase currents of the alternating-current motor based on the output of the current detector and converts the sampled phase currents into a d-axis current and a q-axis current, and the predetermined first electrical angle is set such that the number of angle interruptions varies according to the rotation speed of the alternating-current motor.

2. The control apparatus according to claim 1, wherein the predetermined first electrical angle is set such that the number of angle interruptions increases as the rotation speed of the alternating-current motor decreases.

3. The control apparatus according to claim 2, wherein the torque estimating portion includes an interruption angle setting portion that switches the predetermined first electrical angle between a preset first angle and a preset second angle based on a comparison result between the rotation speed of the alternating-current motor and a predetermined reference rotation speed, and the interruption angle setting portion switches between first angle and the second angle with hysteresis.

4. The control apparatus according to claim 2, wherein the torque estimating portion further includes a signal converting portion that converts the output of the current detector and the output of the position detector into a digital signal, respectively, in a predetermined conversion cycle, and the predetermined first electrical angle is set such that the execution cycle of the angle interruption becomes longer than the predetermined conversion cycle.

5. The control apparatus according to claim 1, wherein the inverter includes a power semiconductor switching element that is selectively turned on and off according to the control command from the rectangular wave voltage control portion; the voltage controlling portion executes a switching interruption that outputs the control command to the power semiconductor switching element every predetermined second electrical angle that is set in advance; and the torque estimating portion inactivates the angle interruption according to the rotation speed of the alternating-current motor when the timing at which the angle interruption is executed matches the timing at which the switching interruption is executed.

6. The control apparatus according to claim 5, wherein the torque estimating portion inactivates the angle interruption when the rotation speed of the alternating-current motor falls below a predetermined reference rotation speed.

7. The control apparatus according to claim 5, wherein the torque estimating portion further includes a signal converting portion that converts the output of the current detector and the output of the position detector into a digital signal, respectively, in a predetermined conversion cycle, and the predetermined first electrical angle is set such that the execution cycle of the angle interruption becomes longer than the predetermined conversion cycle.

8. The control apparatus according to claim 1, wherein the inverter includes a power semiconductor switching element that is selectively turned on and off according to the control command from the rectangular wave voltage control portion; the voltage controlling portion executes a switching interruption that outputs the control command to the power semiconductor switching element every predetermined second electrical angle that is set in advance; the predetermined first electrical angle is set such that the angle interruption is executed a plurality of times between the last execution of the switching interruption and the current execution of the switching interruption; and the torque estimating portion includes a filtering portion that smoothes a change, in the direction of the temporal axis, in the d-axis current and the q-axis current each calculated during the plurality of executions of the angle interruption, and an estimated torque calculating portion that calculates the estimated torque based on the d-axis current and the q-axis current that have been smoothed by the filtering portion.

9. The control apparatus according to claim 8, wherein the voltage phase controlling portion performs a feedback control calculation that adjusts the phase of the rectangular wave voltage according to a difference between the estimated torque calculated by the estimated torque calculating portion and the torque command value, during the final time that the angle interruption is executed, from among the plurality of times that the angle interruption is executed.

10. The control apparatus according to claim 8, wherein the torque estimating portion further includes a signal converting portion that converts the output of the current detector and the output of the position detector into a digital signal, respectively, in a predetermined conversion cycle, and the predetermined first electrical angle is set such that the execution cycle of the angle interruption becomes longer than the predetermined conversion cycle.

11. The control apparatus according to claim 1, wherein the torque estimating portion further includes a signal converting portion that converts the output of the current detector and the output of the position detector into a digital signal, respectively, in a predetermined conversion cycle, and the predetermined first electrical angle is set such that the execution cycle of the angle interruption becomes longer than the predetermined conversion cycle.

* * * * *